US012349258B2

(12) United States Patent
Eiding et al.

(10) Patent No.: US 12,349,258 B2
(45) Date of Patent: Jul. 1, 2025

(54) LOAD CONTROL ON WIRED AND WIRELESS COMMUNICATION LINKS

(71) Applicant: Lutron Technology Company LLC, Coopersburg, PA (US)

(72) Inventors: Mark Eiding, Quakertown, PA (US); Mark Ryan Lopez, Lansdale, PA (US); David L. Wykes, Jr., Quakertown, PA (US); Noopur Zokarkar, Bethlehem, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 167 days.

(21) Appl. No.: 18/221,175

(22) Filed: Jul. 12, 2023

(65) Prior Publication Data

US 2023/0354497 A1 Nov. 2, 2023

Related U.S. Application Data

(63) Continuation of application No. 17/492,436, filed on Oct. 1, 2021, now Pat. No. 11,743,995.

(60) Provisional application No. 63/087,084, filed on Oct. 2, 2020.

(51) Int. Cl.
*H05B 47/175* (2020.01)
*G05B 15/02* (2006.01)
*H04L 67/12* (2022.01)

(52) U.S. Cl.
CPC ........... *H05B 47/175* (2020.01); *G05B 15/02* (2013.01); *H04L 67/12* (2013.01)

(58) Field of Classification Search
CPC ..... H04W 12/106; H04W 4/70; H04W 84/18; H04L 1/1874; G06N 3/043; G06N 5/048; G06N 5/025; G06F 2211/005; G06F 9/546; H05B 47/175; H05B 47/19; H05B 47/1985; H05B 47/18; H05B 47/155; H05B 47/183; H05B 47/199
See application file for complete search history.

(56) References Cited

U.S. PATENT DOCUMENTS

| | | | |
|---|---|---|---|
| 7,369,060 B2 | 5/2008 | Veskovic et al. | |
| 7,391,297 B2 | 6/2008 | Cash et al. | |
| 10,423,133 B2 | 9/2019 | Baluja et al. | |

(Continued)

FOREIGN PATENT DOCUMENTS

| | | |
|---|---|---|
| WO | 2012085738 A1 | 6/2012 |
| WO | 2016013939 A1 | 1/2016 |

*Primary Examiner* — Monica C King
(74) *Attorney, Agent, or Firm* — Flaster Greenberg PC

(57) ABSTRACT

A load controller in a load control system may communicate messages with controllable loads on a plurality of loops for controlling electrical loads. Each controllable load may include a load control device and an associated electrical load. The messages received by the load controller may include a zone identifier. The zone identifier may be associated with the load control devices for being controlled together. The load controller may communicate messages to sets of load control devices for performing common control of the load control devices on each loop using group messages. The load controller may reconfigure the zones that are assigned group identifiers for receiving group messages on the loops, such that the group identifiers are assigned to the zones that have larger numbers of load control devices. The message types on a given loop may be selected based on the type of control being transmitted in the commands.

31 Claims, 12 Drawing Sheets

(56) References Cited

U.S. PATENT DOCUMENTS

| | | |
|---|---|---|
| 10,645,771 B1 | 5/2020 | Eltoft et al. |
| 11,036,197 B2 | 6/2021 | Baluja et al. |
| 2017/0235470 A1 | 8/2017 | Baluja et al. |
| 2019/0098725 A1 | 3/2019 | Sadwick et al. |
| 2020/0019131 A1 | 1/2020 | Baluja et al. |
| 2022/0110203 A1 | 4/2022 | Eiding et al. |
| 2022/0170320 A1 | 6/2022 | Casey et al. |

| Load Control Index | Zone Identifier | Loop Number | Load Control Devices Per Zone |
|---|---|---|---|
| 12 | 10 | 1 | 3 |
| 34 | 10 | 1 | |
| 88 | 10 | 2 | |
| 0 | 23 | 1 | 4 |
| 78 | 23 | 2 | |
| 42 | 23 | 1 | |
| 89 | 23 | 2 | |
| 34 | 34 | 1 | 2 |
| 123 | 34 | 2 | |
| 121 | 45 | 2 | 4 |
| 111 | 45 | 2 | |
| 110 | 45 | 2 | |
| 96 | 45 | 2 | |
| 61 | 58 | 1 | 1 |
| 127 | 56 | 2 | 1 |
| 65 | 108 | 2 | 5 |
| 66 | 108 | 2 | |
| 67 | 108 | 2 | |
| 68 | 108 | 2 | |
| 69 | 108 | 2 | |

FIG. 3B

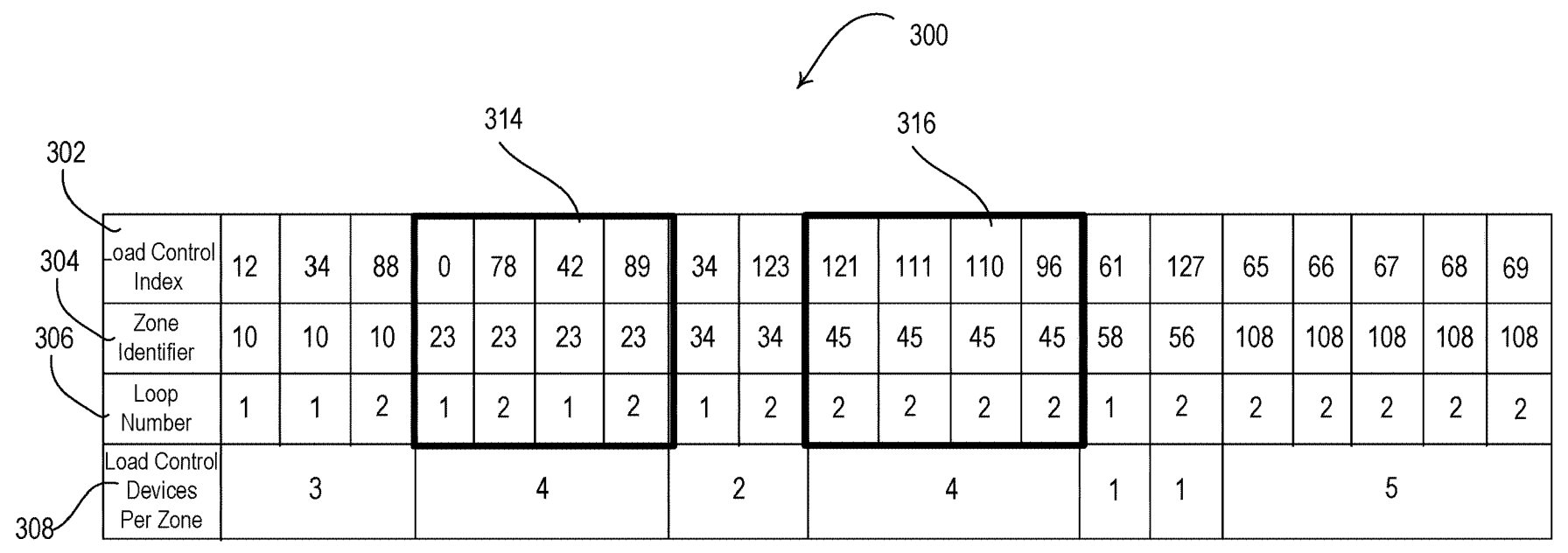

| Load Control Index | Zone Identifier | Loop Number | Load Control Devices Per Zone |
|---|---|---|---|
| 12 | 10 | 1 | 3 |
| 34 | 10 | 1 | |
| 88 | 10 | 2 | |
| 0 | 23 | 1 | 4 |
| 78 | 23 | 2 | |
| 42 | 23 | 1 | |
| 89 | 23 | 2 | |
| 34 | 34 | 1 | 2 |
| 123 | 34 | 2 | |
| 121 | 45 | 2 | 4 |
| 111 | 45 | 2 | |
| 110 | 45 | 2 | |
| 96 | 45 | 2 | |
| 61 | 58 | 1 | 1 |
| 127 | 56 | 2 | 1 |
| 65 | 108 | 2 | 5 |
| 66 | 108 | 2 | |
| 67 | 108 | 2 | |
| 68 | 108 | 2 | |
| 69 | 108 | 2 | |

FIG. 3C

| Group Array_Loop 1 | 23 | 10 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|---|
| Group Array_Loop 2 | 108 | 23 | 45 | 0 | 0 | 0 | 0 | 0 | 0 | 0 | 0 | 0 | 0 | 0 | 0 | 0 |
| Group Identifier | 0 | 1 | 2 | 3 | 4 | 5 | 6 | 7 | 8 | 9 | 10 | 11 | 12 | 13 | 14 | 15 |

FIG. 4

LOAD CONTROL ON WIRED AND WIRELESS COMMUNICATION LINKS

CROSS-REFERENCE TO RELATED APPLICATIONS

This application is a continuation of Non-Provisional U.S. patent application Ser. No. 17/492,436, filed Oct. 1, 2021, which claims the benefit of Provisional U.S. Patent Application No. 63/087,084, filed Oct. 2, 2020, the disclosure of which is incorporated herein by reference in its entirety.

BACKGROUND

A user environment, such as a residence or an office building, for example, may be configured with a lighting control system. The lighting control system may be used to control the lighting loads providing artificial light in the user environment. Each load control system may include various control devices, including input devices and lighting control devices. The lighting control devices may receive messages from the input devices, which may include load control instructions, for controlling a corresponding electrical load. Examples of lighting control devices may include a dimmer switch, an electronic switch, a ballast, or a light-emitting diode (LED) driver. Examples of input devices may include remote control devices or sensors (e.g., occupancy sensors, daylight sensors, temperature sensors, and/or the like). Remote control devices may receive user input for performing lighting control. Sensor devices may detect sensor events for performing lighting control.

SUMMARY

A load controller in a load control system may communicate messages with controllable loads on a plurality of loops for controlling electrical loads. Each controllable load may include one or more load control devices for controlling a corresponding electrical load. Each loop may be a wired communication link on which communications may be performed for transmitting commands to the controllable loads to control the electrical loads. The load controller may receive messages from input devices in the load control system that include commands for controlling the electrical loads. The load controller may transmit commands to the controllable loads on each loop in order to control the electrical loads of the controllable loads on each loop.

The messages received by the load controller may include a zone identifier for controlling zones of electrical loads. The zone identifier may be associated with the controllable loads (e.g., the load control devices of the controllable loads) for being controlled together. The load controller may identify the controllable loads associated with the zone identifier in the messages that are received and transmit commands on one or more loops on which the controllable loads are located for performing load control.

The load controller may transmit individual messages to controllable loads on each loop for controlling the electrical loads. The individual messages may include a respective load control index (e.g., a respective load control device index) associated with the controllable load to which the message is being transmitted on the loop. The load controller may communicate messages to sets of controllable loads for performing common control of the controllable loads on each loop using group messages. The group messages may include a group identifier that is recognized by the load control devices in the group and the same message may be transmitted to control multiple controllable loads.

As the number of zones configured in the load control system may be greater than the number of groups for communicating group messages, the load controller may reconfigure the zones that are assigned group identifiers for receiving group messages on the loops. The load controller may reconfigure the group identifiers for communicating group messages on each loop, such that the group identifiers are assigned to the zones that have larger number of controllable loads. The zones that have a number of controllable loads that are below a threshold on a given loop may be communicated with using individual messages to reserve the group messages for larger sets of devices on the loop. As the controllable loads in a given zone may be distributed across multiple loops, the number of controllable loads on each loop for the selected zone may be analyzed in determining whether to assign a group identifier to the zone for communicating with the controllable loads in the zone. Assigning group identifiers to larger zones of controllable loads for enabling group messages to be transmitted to larger zones may allow for more efficient communication of commands for controlling electrical loads in the same zone, and reduce any delay in controlling each of the electrical loads in the zone.

The message types on a given loop may be selected based on the type of control being transmitted in the commands on the loop. For example, a broadcast message may be transmitted on the loop for controlling each of the controllable loads on the loop when each of the electrical loads are to be similarly controlled using the same command. Group messages may be transmitted on the loop for controlling each of the controllable loads in the group when each of the electrical loads in a group are to be similarly controlled using the same command. Transmitting a different message type based on the type of control being performed may allow a more efficient communication of messages for coordinated control, and reduce any delay in controlling each of the electrical loads in the zone.

BRIEF DESCRIPTION OF THE DRAWINGS

FIGS. 3A-3D illustrate example datasets comprising a mapping of controllable loads to zone identifiers.

FIG. 4 illustrates an example dataset comprising group arrays for multiple loops.

DETAILED DESCRIPTION

Figure 1:
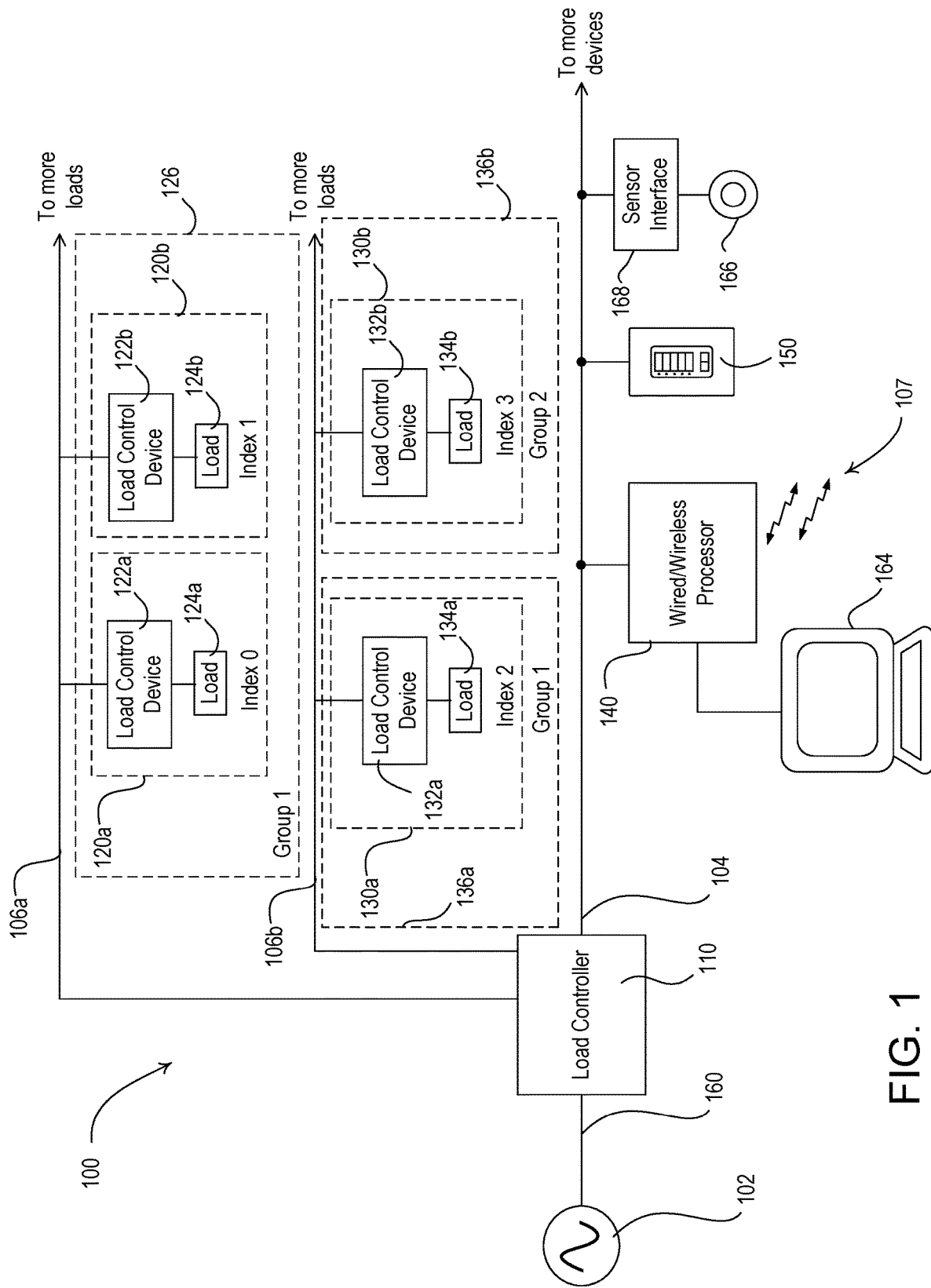
FIG. 1 is a diagram of an example load control system.

FIG. 1 is a diagram of an example load control system 100 for controlling the amount of power delivered from a power source 102 to one or more electrical loads 124*a*, 124*b*, 134*a*, 134*b*. The power source 102 may be an alternating-current (AC) or direct current (DC) power source. The load control system 100 may comprise a number of control devices for controlling electrical loads. The control devices may comprise input devices and/or load control devices for controlling electrical loads. The input devices may be operable to transmit messages in response to user inputs, sensor inputs, or other input information and transmit messages for enabling load control. The control devices may include load control devices that may be operable to receive messages and/or control respective electrical loads in response to the received messages form input devices or other devices in the load control system 100.

The control devices of the load control system 100 may comprise one or more input devices, e.g., such as a wired keypad device 150 and/or a wired sensor 166, for transmitting messages on a wired communication link 104 for controlling one or more electrical loads 124a, 124b, 134a, 134b. The wired keypad device 150 may be configured to transmit messages via a wired communication link 104 in response to an actuation of one or more buttons of the wired keypad device 150. The messages may include an indication of the button pressed on the wired keypad device 150. The wired keypad device 150 may be adapted to be wall-mounted in a standard electrical wallbox.

The wired sensor 166 may be configured to perform measurements and transmit messages on the wired communication link 104 in response to the measurements. For example, the wired sensor 166 may be a wired daylight sensor configured to measure (e.g., periodically measure) a signal (e.g., a photosensor or photodiode current) that may be used to determine a value indicative of a light intensity in the space in which the wired daylight sensor 166 is installed (e.g., sensor data). The wired sensor 166 may be an occupancy sensor configured to transmit messages on the wired communication link 104 in response to sensing an occupancy and/or vacancy condition for controlling an electrical load in the load control system 100. The wired sensor 166 may transmit messages that include occupancy conditions or a vacancy conditions identified by the wired sensor 166.

The wired sensor 166 may be configured to be coupled with a sensor interface 168. The wired sensor 166 may transmit messages (e.g., which may include a respectively measured signal) to the sensor interface 168 periodically in response to periodic measurements. The sensor interface 168 may be configured to transmit a message via the wired communication link 104 in response to a message received from the wired sensor 166. For example, the sensor interface 168 may be configured to convert the signal measured by the wired sensor 166 into an appropriate value that indicates the measurements taken in the space (e.g., a daylight value, such as foot-candles or another daylight value) and may further transmit the value via the wired communication link 104. For example, the value may be used for controlling the intensities of one or more of the electrical loads in the load control system. One or more wireless devices (e.g., sensors) may send messages to the sensor interface 168 via a wireless communication link, which may then forward the messages to other devices in the load control system 100 via the wired communication link 104.

The load control system 100 may comprise a wired/wireless processor 140 configured to receive messages from input devices via the wired communication link 104 and/or transmit commands for controlling one or more electrical loads. The wired/wireless processor may be, for example, a system controller. For example, the wired/wireless processor 140 may receive messages from one or more input devices on the wired communication link 104 and transmit messages for controlling electrical loads in response to the messages received from the input devices. For example, the wired/wireless processor 140 may have stored thereon an association of input devices to load control devices for transmitting message to the load control devices for enabling load control of electrical loads in response to messages received from the input devices. The wired/wireless processor 140 may store a zone identifier associating devices programmed in a same zone for enabling control of zones of load control devices in response to messages received from input devices in the same zone for example. For example, the wired/wireless processor may transmit a zone identifier in messages on the wired communication link 104 for controlling one or more, such as multiple, load control devices in the defined zone. For example, multiple load control devices may be assigned to a zone (or area), and that zone and thus the load control devices in that zone associated with a zone identifier. By using a zone identifier, the wired/wireless processor may transmit one message with the zone identifier and control the multiple load control devices in that zone with the one command.

The wired/wireless processor 140 may be configured to communicate on the wired communication link 104 and/or to communicate on a wireless communication link via RF signals 107. The wired/wireless processor 140 may receive messages from input devices and/or a network computing device 164 via the wired communication link 104 and/or the RF signals 107. The wired/wireless processor 140 may transmit messages to a load controller 110 for enabling configuration of the load control system and/or controlling electrical loads 124a, 124b, 134a, 134b in the load control system 100 in response to the messages that are received. The wired/wireless processor 140 may include a memory that has stored thereon one or more associations between zone identifiers and load control indices configured for each zone. For example, each load control device may be associated with a load control index that may be used to identify the load control device and/or to send messages to the load control device via a wired communication link. Further, each device in the load control system 100 (e.g., including load controllers, load control devices, system controllers, input devices, etc.) may be associated with a unique identifier, which may be a serial number of the device. The wired/wireless processor 140 may also, or alternatively, have unique identifiers of respective load controllers associated with respective load control devices the load controllers are able to control. This may be the case if the load control system 100 includes multiple load controllers. If the load control system 100 includes multiple load controllers, the wired/wireless processor 140 may determine which load controller to transmit a message to based on a group identifier included in the message.

The operation of the load control system 100 may be programmed and/or configured at one or more devices using a network computing device, such as the personal computing device 164 or other computing device, such as a mobile user device for example. The personal computing device 164 may execute a graphical user interface (GUI) configuration software for allowing a user to program how the load control system 100 may operate. The configuration software may generate a dataset that defines the operation of the load control system 100. For example, the dataset may include information regarding the operational settings of different load control devices 122a, 122b, 132a, 132b of the load control system 100. The dataset may include association information regarding associations of the unique identifiers and/or the load control indices of load control devices and the input devices capable of performing control of the associated load control devices (e.g., the wired keypad device 150 and/or the sensor 166). The dataset may include zone configuration information comprising zone identifiers for identifying zones of load control devices and input devices programmed for enabling load control in the zone. For example, load control devices may be configured via the configuration software as being in a same zone and input devices may also be associated with that zone for common control of load control devices in the zone. The dataset, or portions thereof, may be transmitted to one or more load controllers 110, wired/wireless processors 140, and/or control devices (e.g., load control devices and/or input devices) via wired and/or wireless communication links for being stored thereon. For example, the dataset may be transmitted to other devices on the wired communication link 104, or the wireless communication link via the RF signals 107. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosures of which are hereby incorporated by reference.

The load control system 100 may comprise a load controller 110 configured to receive messages from input devices and/or the wired/wireless processor 140 on the wired communication link 104 and performing control of one or more electrical loads 124a, 124b, 134a, 134b in response to such messages. The load controller 110 may be configured to receive power from the power source 102 via the power line 160 and providing power to the one or more electrical loads 124a, 124b, 134a, 134b with which it is electrically connected. The load controller 110 may be connected to the electrical loads via one or more loops 106a, 106b. Each loop 106a, 106b may include a wired power/communication link for providing power to and/or controlling one or more electrical loads on the loop 106a, 106b. In an example, each of the loops 106a, 106b may be a digital addressable lighting interface (DALI) loop or another wired link capable of providing power to and/or communication with one or more load control devices 122a, 122b, 132a, 132b for controlling corresponding electrical loads 124a, 124b, 134a, 134b. Though shown as a wired link, each loop 106a, 106b may comprise a wireless communication link on which messages are transmitted for controlling electrical loads (in addition, for example, to a wired power link).

Each loop 106a, 106b may include one or more addressable controllable loads 120a, 120b, 130a, 130b. A controllable load may also be referred to as a "switchleg," as the controllable load may be a leg on a loop that is capable of being switched or otherwise controlled as described herein. Each of the controllable loads 120a, 120b, 130a, 130b may include one or more load control devices for controlling a corresponding electrical load. The controllable loads 120a, 120b may be located on the loop 106a, and the controllable loads 130a, 130b may be located on a different loop 106b. The controllable load 120a may comprise a corresponding load control device 122a and/or electrical load 124a that are supplied power from the load controller 110 on the loop 106a. The controllable load 120b may also comprise a corresponding load control device 122b and/or electrical load 124b that are supplied power from the load controller 110 on the loop 106a. Similarly, the controllable load 130a may comprise a corresponding load control device 132a and/or electrical load 134a that are supplied power from the load controller 110 on the loop 106b, and the controllable load 130b may comprise a corresponding load control device 132b and/or electrical load 134b that are supplied power from the load controller 110 on the loop 106b.

The load control devices 122a, 122b, 132a, 132b may be lighting control devices that may comprise, for example, a ballast, or a light-emitting diode (LED) driver. The electrical loads 124a, 124b, 134a, 134b may be lighting loads that may comprise fluorescent lamps or LED light sources (e.g., emitters) for being controlled by the respective lighting control devices. The lighting control devices may control the intensity level and/or color (e.g., color temperature) of their respective lighting loads. Though lighting control devices and lighting loads are provided as examples of load control devices and electrical loads, respectively, other types of load control devices and electrical loads may be similarly implemented on addressable load lines of loops 106a, 106b.

The input devices and the load control devices 122a, 122b, 132a, 132b in the load control system may be configured to be zoned together for enabling control of the load control devices in response to the input devices in the same zone. Although reference may be made herein to load control devices, it should be understood that the terms "load control device" and "controllable load" may be used interchangeably herein. For example, the input devices and the load control devices may be associated with a common zone identifier in memory for enabling control of load control devices in response to commands received from input devices in the same zone. The zone identifiers and the devices associated with each zone identifier may be stored in memory at one or more devices. For example, the wired/wireless processor 140 and/or the load controller 110 may store the association of the zone identifiers with the input devices and/or load control devices in each zone. In one example, the wired/wireless processor 140 may receive messages from input devices and identify the load control devices that are stored in the same zone for sending messages for controlling the electrical loads in the zone. The load controller 110 may receive these messages from the wired/wireless processor, or may receive the messages directly from the input devices, on the wired communication link 104. The messages received by the load controller 110 may include the unique identifier of the input device from which the message is received and/or the zone identifier for controlling the load control devices in the same zone.

The load controller 110 may have stored thereon a mapping of the zone identifiers to the controllable loads 120a, 120b, 130a, 130b that are programmed to be controlled in the same zone. For example, each of the load control devices 122a, 122b, 132a, 132b for a corresponding controllable load 120a, 120b, 130a, 130b may have a unique load control index used by the load controller 110 to communicate messages via the loops directly to the load control devices of the controllable loads for performing control. For example, as described herein, each load control device may be associated with a unique identifier (e.g., a serial number) that may be used to communicate messages to the load control device via a wired communication link and/or a wireless communication link. Each load control device may be further associated with a load control index, which may be used by the load controller 110 (e.g., or another device in the load control system 100) to communicate with the load control device via the wired communication link. The load control index may be used by the load controller 110 or other devices in the load control system as a unique identifier that is stored at the load controller 110 for communicating with load control devices and may be associated with other device identifiers or zone identifiers for enabling load control as described herein. Each of the load control indices may be unique, regardless of the loop 106a, 106b on which the load control devices are located. For example, the load control device 122a of controllable load 120a may have a load control index of "0", the load control device 122b of the controllable load 120b may have a load control index of "1", the load control device 132a of controllable load 130a may have a load control index of "2", and the load control device 132b of controllable load 130b may have a load control index of "3". The load controller 110 may receive a message that comprises a zone identifier, or the unique identifier of an input device associated with the zone identifier, and perform a lookup in a mapping of zone identifiers to determine the load control index of the load control devices 122a, 122b, 132a, 132b assigned to that zone for being controlled.

Though the load control index may be a unique number stored at the load controller 110, each loop may have individual addresses for each load control device (e.g., each controllable load) that are used or that correspond to the load control indices stored at the load controller. For example, each loop may use a predefined number of addresses or indices, such as 0-63, for communicating with controllable loads on the loop. Loop "1" may have addresses 0-63, loop "2" may have addresses 64-127, and so on. Thus, the load control indices having values 0-63 may correspond to addresses 0-63 on loop "1"; load control indices having values 64-127 may correspond to addresses 0-63 on loop "2"; and so on. The load controller may use the load control indices for communicating, or may look up the address of a load control device on a given loop for performing communications with the controllable load based on the control indices.

The load controller 110 may send messages to each controllable load 120a, 120b, 130a, 130b (e.g., each load control device 122a, 122b, 132a, 132b) independently using the load control indices. However, messages that are sent in sequence to controllable loads on the same loop may create delay in the control of the electrical loads. For example, if the load controller 110 receives a message and determines that the load control device 122a of the controllable load 120a and the load control device 122b of the controllable load 120b are in the same zone for being controlled in response to the message, the load controller 110 may send sequential messages to the load control device 122a and 122b on the loop 106a using their respective load control indices. The delay in the transmission of the sequential messages may cause a delay in the control of the electrical loads 124a, 124b, which may be noticeable to the occupants of the space. For example, the delay in transmission of the sequential messages may cause electrical loads (e.g., which may be lighting loads) to be controlled in sequence rather than simultaneously, which may be exacerbated as the number electrical loads being controlled increases. For example, lighting loads may turn on, turn off, and/or change in intensity level or color temperature, etc. in sequence rather than simultaneously.

To prevent such delay in the control of the electrical loads, the load controller 110 may group controllable loads that are to receive the same commands for control. For example, the load controller 110 may group the load control devices associated with the controllable loads. The grouping of the load control devices may allow the load controller 110 to send a single message having a group identifier that is transmitted on the same loop for being received by each of the load control devices of the controllable loads in the group. For example, each load control device may be configured to receive the message with the group identifier, and determine that the load control device is associated with the group identifier in the message. Thus, the load controller 110 may use the group identifier as an "address" to direct which load control devices should process and/or respond to the message. Using the single group message may allow each of the load control devices in the group to receive the message at the same time or closer in time, resulting in the control of the electrical loads occurring closer in time and with less noticeable delay or without noticeable delay to occupants in the space.

The load control devices that are in the same group may be limited to the load control devices that are on the same loop. For example, the load control devices 122a, 122b may be grouped together in the group 126 since they are on the same loop 106a. The load control devices 132a, 132b may be capable of being grouped together since they are on the same loop 106b, but may be grouped separately in group 136a and 136b, as they may be in separate zones for control or otherwise separated for purposes of control.

Each load control device 122a, 122b, 132a, 132b may be limited to being included in a single group and associated with a single group identifier for receiving messages directed to that group. For example, as shown in FIG. 1, each of the load control devices 122a and 122b may be limited to being included in the group 126 and may not be included in another group. Similarly, each of the load control devices 132a and 132b may be limited to being included in their respective groups 136a, 136b. In another example, a load control device, such as 122a, 122b, 132a, 132b, may be included in more than one group for receiving group messages.

The number of zones that are configured in the load control system may not align with the number of groups available for controlling the controllable loads (e.g., via the load control devices) on each loop 106a, 106b. If the load control system 100 allows for configuration of more zones than there are groups available on a given loop 106a, 106b, the load controller 110 may receive messages for controlling load control devices in a given zone that cannot be controlled using group messages on the loops 106a, 106b. For example, in a load control system that allows for configuration of 64 zones, while each loop 106a, 106b is limited to 16 groups, there may be load control devices for controllable loads on a given loop 106a, 106b that are associated with a zone and that are unable to be controlled with a group message. For example, each loop may be limited to a certain number of groups because the range of group identifiers available may be limited (e.g., a certain number of bits may be allocated for the group identifier in messages send on the loop). For example, in a given wired communication protocol (e.g., the DALI communication protocol), messages sent on the loop may have a header, of which a certain number of bits (e.g., 4) may be allocated for the group identifier. This may result in the load controller 110 sending sequential messages to control the load control devices that are not assigned a group identifier, resulting in the delay in control of the electrical loads described herein.

During configuration of the load control system 100, the group identifiers may be inefficiently assigned to load control devices on a given loop 106a, 106b. For example, a group identifier may be assigned to the group 136a and/or the group 136b on the loop 106b, even though each of these groups may have a single controllable load 130a, 130b, respectively, and each controllable load 130a, 130b may be a single controllable load in a given zone for being controlled in the load control system 100. Other load control devices that are a part of a larger zone on the same loop 106b may be unable to be assigned a group identifier for receiving group messages, due to the limit on the number of group identifiers on the loop 106b. These load control devices that fail to receive a group identifier for their zone may have to be sent individual messages sequentially by the load controller 110 on the loop 106b for performing zone control in response to messages from input devices, which may result in the delayed control of the electrical loads on the loop 106b, as described herein. For example, a command to control a first zone that includes one device and a second zone that includes ten devices may be received. If the first zone is associated with a group identifier and the second zone is not, a total of eleven messages may be needed to control the two zones. However, if the second zone is associated with a group identifier and the first zone is not, only two messages may be needed to control the two zones. Similarly, the load control devices 122a, 122b may be assigned a group identifier for the group 126, which may prevent a larger number of load control devices for controllable loads in a larger zone from being able to receive group messages on the loop 106a for performing zone control.

The load controller 110, or another device in the load control system (e.g., the wired/wireless processor 140), may map or remap the load control indices in one or more groups on each of the loops 106a, 106b to improve or optimize communication on the loops 106a, 106b and/or control of the electrical loads. For example, the load control indices of load control devices that are assigned to larger zones in the load control system 100 for being controlled together may be mapped to a group identifier on the loops 106a, 106b. This may allow larger zones of electrical loads to be controlled on the loops 106a, 106b by the load controller 110 with the same group message using a group identifier, while maintaining the individual messages using the load control indices of the individual load control devices for the smaller zones and/or individual load control devices. Any delay in control in smaller zones may be less noticeable to the user than delay in control that may be caused from the sequential messages being transmitted to load control devices in larger zones.

Figure 2A:
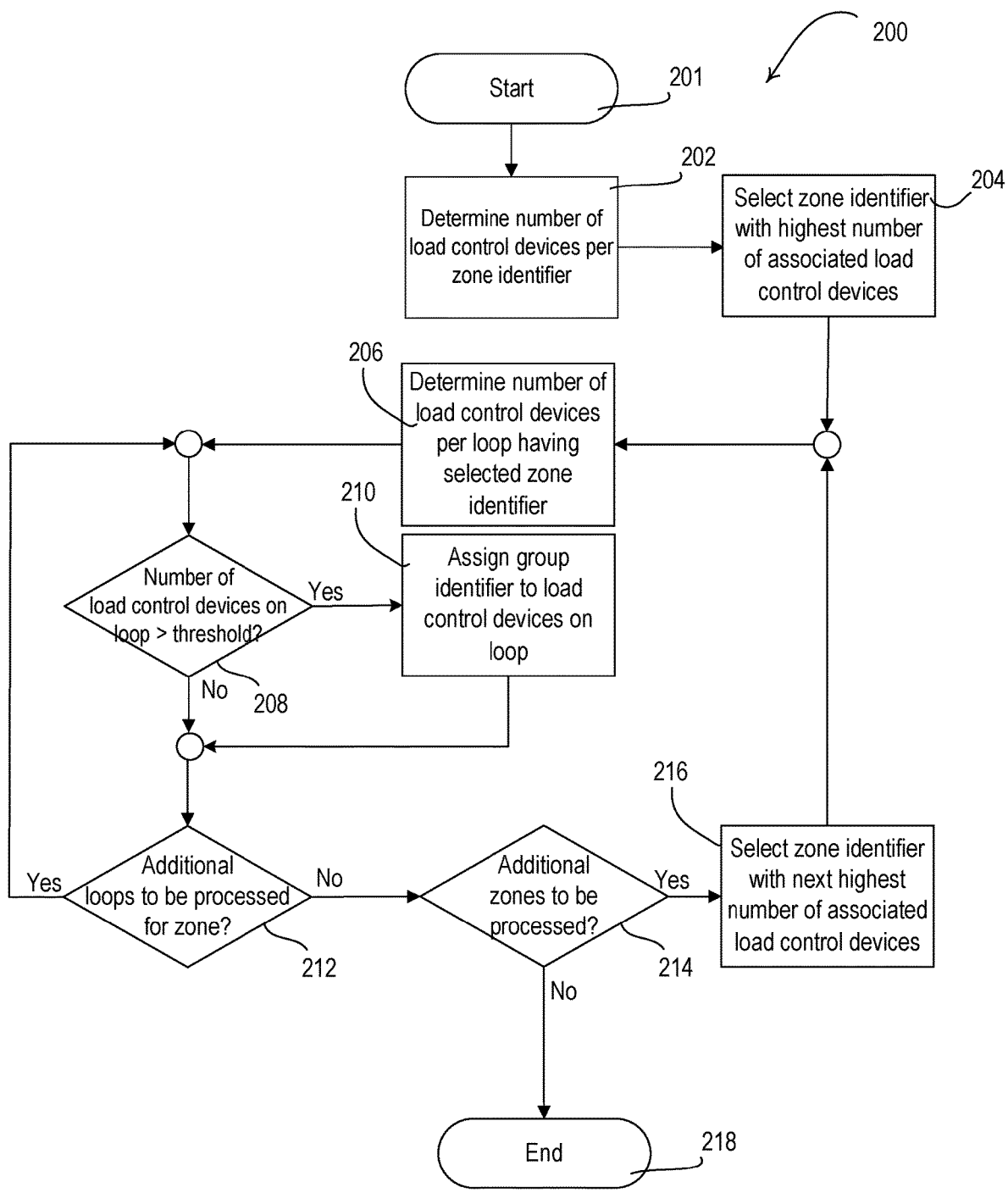
FIG. 2A is a flowchart of an example procedure for assigning group identifiers to load control devices in zones in a load control system.

FIG. 2A is a flowchart of an example procedure 200 for assigning group identifiers to load control devices in zones in a load control system. The procedure 200 may be performed by a load controller, such as the load controller 110 shown in FIG. 1, or another device in the load control system. For example, the procedure 200 may be performed by a wired/wireless processor, such as the wired/wireless processor 140 shown in FIG. 1, or another local or remote computing device. The procedure 200 may be stored in memory as computer-readable or machine-readable instructions that may be executed by a control circuit of one or more devices for executing the procedure. Though the procedure 200 may be described herein as being performed by a single device, such as a load controller, the procedure 200, or portions thereof, may be performed by another device or distributed across multiple devices, such as a wired/wireless processor and/or one or more other devices. Additionally, although the procedure 200 may be described herein as being performed by a single load controller, the procedure 200, or portions thereof, may be performed by one or more load controllers.

As shown in FIG. 2A, the procedure 200 may begin at 201. The procedure 200 may be initiated to map or remap the load control indices to group identifiers for improved control of controllable loads in the same zone. The procedure 200 may be initiated when a user configures or reconfigures the zones in a load control system. For example, a user may reconfigure the zones for the control devices and send a message to the load controller (e.g., via a wired/wireless processor, a mobile device or another computing device capable of communicating with the load controller) that includes an updated zone configuration information for the load control system. The zone configuration information may include an association of zone identifiers to controllable loads and/or load control devices. In another example, the load controller may initiate the procedure at 201 after detecting that a number of messages being transmitted individually to load control devices in the same zone exceeds a threshold.

At 202, a control circuit of the load controller may determine a number of controllable loads per zone identifier. Each controllable load may be associated with one or more load control devices for controlling respective electrical loads. For example, the load control devices of the controllable loads may each be associated with a zone identifier in memory of the load controller for enabling control in response to messages that include the zone identifier and/or messages from input devices that are associated in memory with the same zone identifier. The load controller may determine the number of load control devices per zone identifier by grouping the load control indices stored in a dataset in memory by zone identifier and sorting the dataset by the zone identifiers.

Figure 3A:
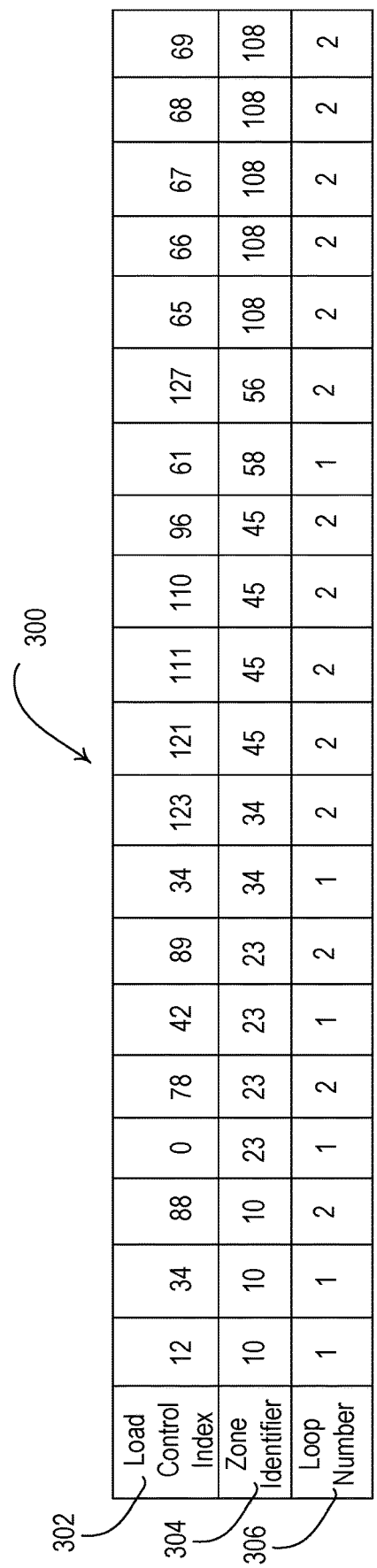

An example dataset 300 is shown in FIG. 3A, in which load control indices are grouped and sorted by zone identifier. A similar type of dataset may be stored at the load controller or another device, such as the wired/wireless processor, that may perform the procedures herein. As shown in FIG. 3A, the dataset 300 may include load control indices 302 for the load control devices controlled by the load controller. Each load control index 302 may be stored with a corresponding zone identifier 304. The dataset 300 may include a loop number 306 on which the load controller communicates with each load control device using the load control index 302 or a corresponding address on a given loop as described herein. For example, the loop number 306 may indicate which loop a given load control device is on. Although a system including 2 loops is disclosed herein, any number of loops may be used. For example, each load control device associated with the controllable loads on a first loop may be given a load control index within a first range of load control indices (e.g., 0-63, where 64 load control devices are supported), while the load control devices associated with the controllable loads on a second loop may be given a load control index within a second range of load control indices (e.g., 64-127, where 64 load control devices are supported). Similar types of identifiers may be used when additional loops are supported. As described herein, the load control index may be included by the load controller in the message itself, or may be stored at the load controller and the load controller may determine the loop number and an address on the loop that corresponds with the load control index (e.g., each loop may have addresses 0-63 for communicating with individual load control devices), and may use the address to communicate messages to the load control device.

Referring again to the procedure 200 of FIG. 2A, the load controller may select the zone identifier with the highest number of load control devices (e.g., the highest number of controllable loads) for being grouped at 204. At 206, the control circuit of the load controller may determine the number of load control devices on each loop that are associated with the selected zone identifier. For example, starting with the zone identifier having the highest number of associated load control devices, the load controller may determine the number of load control devices on each loop (e.g., number of load control devices on loop 1, number of load control devices on loop 2, etc.) that are associated with the zone identifier. As described herein, the dataset at the load controller may have the loop stored therein that corresponds to each load control index, or the loop may be determined from the load control index itself. For example, load control indices 0-63 may be reserved for loop 1 and load control indices 64-127 may be reserved for loop 2 when each loop supports 64 load control devices. Alternatively, each loop may use the same set of indices.

Referring again to the dataset 300, as illustrated in FIG. 3B the load controller may identify a number of load control devices per zone (row 308) in the dataset 300. The load controller may analyze the number of load control devices per zone to identify the zone with the highest number of load control devices. As the zone identifiers 304 are sorted in the dataset 300, the load controller may count the number of load control indices 302 that correspond to the same zone identifier 304 in the dataset 300. In this example, the load controller may then identify the zone identifier 304 associated with each load control index in the set of load control devices 312 (e.g., zone identifier "107"). The load controller may identify the loop number (e.g., from the loop number 306 in the dataset 300 or determine the loop number from the load control indices 302 as described herein) for each of the load control indices 302 in the set of load control devices 312 that are associated with the zone identifier 304 having the highest number of load control devices (e.g., zone identifier "107"). For example, the load controller may identify that each of the load control indices 302 that are associated with the zone identifier "107" in the dataset 300 are on loop 2.

The load controller may then determine whether to group the load control devices by assigning a group identifier to the load control indices associated with the determined zone. For example, referring again to the procedure 200 of FIG. 2A, the load controller may determine whether the number of load control devices on each loop in set 312 are above a threshold at 208 before assigning a group identifier to the load control devices on the loop. The load controller may start with the number of load control devices on a first loop (e.g., loop 1) and determine whether the number of load control devices on the loop are greater than a threshold at 208. The threshold may be equal to "1", as the load controller may transmit directly to a single load control device using a load control index, or an address on a loop that is determined from the load control index, and may be able to reserve the group identifier on the loop for load control devices associated with another zone. The load controller may also be configured to transmit a message to a load control device on a first loop using the load control index, or an address on a loop that is determined from the load control index, at the same time the load controller transmits a message to a load control device or a group of load control devices in the same zone on a second loop, such that the load control devices in the same zone but on different loops can be controlled at the same time. As such, the load controller may reserve the group identifier for another zone of load control devices when the zone does not have a number of load control devices on the loop that exceed the threshold at 208.

If the number of load control devices is above the threshold at 208, the control circuit of the load controller may assign the load control devices on the loop a group identifier at 210. The load controller may store the group identifier for the load control devices on the loop in memory. The load controller may associate the group identifier with the zone identifier and/or the load control indices of the load control devices in the zone. When the load controller receives a message that includes the zone identifier or a message from an input device associated with the zone identifier, the load controller may know to transmit a message on the loop using the assigned group identifier.

If the number of load control devices is not above the threshold at 208, or the load controller has already assigned the group identifier to the load control devices on a loop that has been evaluated for being grouped, the control circuit of the load controller may determine whether there are additional loops to be processed for the selected zone at 212. For example, when the load controller is configured with two or more loops for communicating with load control devices of controllable loads, the load controller may determine whether to group the load control devices on a first loop that are associated with the zone identifier, and then determine whether to group the load control devices on a second loop that are also associated with the same zone identifier. If load control devices on another loop have yet to be processed, the procedure 200 may return to 208 to determine whether the number of load control devices on the next loop is above the threshold for being grouped. If the load control devices in the zone are each on the same loop, or the load control devices on each of the loops have been evaluated for being grouped, the load controller may determine that there are no additional loops to be processed at 212.

If each of the loops on which the load controller communicates with load control devices have been processed for a given zone, the control circuit of the load controller may determine whether additional zones are to be processed at 214. Additional zones may be processed at 214 if there are additional group identifiers available on one or more loops that have yet to be assigned, or that have yet to be remapped. If there are additional zones to be processed for being assigned group identifiers, the control circuit of the load controller may select another zone identifier at 216. For example, the control circuit of the load controller may select the zone identifier with the next highest number of load control devices for being assigned group identifiers for receiving messages on its loops. The control circuit of the load controller may continue to assign the group identifiers to the load control devices associated with each zone until the group identifiers have been assigned and/or there are no additional zones to be processed at 214.

After the group identifiers are assigned, the load controller may send a message to the load control devices on each of the groups to inform them of the group identifier of the group to which they have been assigned. The load control devices may store the group identifier for being able to recognize messages that are transmitted having the group identifier on their loop. The load controller may use the group identifier for communicating group messages that include commands for controlling each of the load control devices in the group (e.g., in response to messages that include a zone identifier or that are from input devices associated with a zone identifier).

If the procedure 200 is performed by another device, such as a wired/wireless processor or another device in the load control system, the grouping may be performed at the device by identifying the load control devices on each loop for one or more load controllers in the system and providing the group identifiers to the load controllers for being stored thereon. For example, the wired/wireless processor may have stored thereon an association of zone identifiers to load control devices in a given zone. The wired/wireless processor may also have an association stored in memory of the load controllers and the load control devices that are capable of being controlled by messages from each load controller. The wired/wireless processor may know the load control devices on the same loop of a load controller based on the load control indices of the load control devices (e.g., load control indices 0-63 on loop 1 of load controller, load control indices 64-127 on loop 2 of load controller, etc.). The procedure 200 may be performed by a control circuit of the wired/wireless processor for each load controller and the groupings for each load controller may be provided to the load controllers in one or more messages transmitted from the wired/wireless processor.

Referring again to the dataset 300 shown in FIGS. 3A-3D, the dataset 300 illustrates how information may be processed by the load controller using the procedure 200 shown in FIG. 2A. As shown in FIG. 3B, the control circuit of the load controller may identify the set of load control devices 312 as being associated with the largest zone controlled by the load controller (e.g., zone identifier "107"). As such, the load controller may identify the loop number (e.g., from the loop number 306 in the dataset 300 or determine the loop number from the load control indices 302 as described herein) for each of the load control indices 302 in the set of load control devices 312. As each of the load control devices in the set of load control devices 312 are on the same loop (e.g., loop 2) and exceed the threshold for being assigned a group identifier (e.g., 1), the load control devices may be assigned a group identifier. As the set of load control devices 312 are associated with the largest zone, they may be given the first group identifier on the loop (e.g., loop 2).

As shown in FIG. 3C, the control circuit of the load controller may process the next zone(s) for being assigned a group identifier on one or more loops. For example, the control circuit of the load controller may select the zone identifier with the next highest number of load control devices for being processed for group identifiers on the one or more loops. As shown in FIG. 3C, the set of load control devices 314 and the set of load control devices 316 both include 4 load control devices associated with the same zone identifier. The control circuit of the load controller may select one of the zones for being processed first. For example, the control circuit of the load controller may process the set of load control devices 314, as they are associated with a zone identifier having a lower number. As the number of load control devices in the set of load control devices 314 on loop 1 is greater than the threshold (e.g., 1), the load control devices on loop 1 may be given a group identifier for communicating messages for load control on loop 1. Similarly, as the number of load control devices in the set of load control devices 314 on loop 2 is greater than the threshold, the load control devices on loop 2 may be given a group identifier for communicating messages for load control on loop 2. When the load controller receives a message that includes the zone identifier for the set of load control devices 314 (e.g., zone identifier "23"), or a message from input devices associated with the zone identifier for the set of load control devices 314, the load controller may send a group message on loop 1 and a group message on loop 2 for performing control of the set of load control devices 314 associated with the zone identifier. The load controller may send the messages on loop 1 and loop 2 at the same time to enable similar control of the set of load control devices 314 in the same zone, even though the load control devices are on different loops. The load controller may similarly process the set of load control devices 316 for being assigned a group identifier on loop 2 for being transmitted group messages in response to the zone identifier (e.g., zone identifier "45"). A single group identifier may be assigned to separate groups on each loop (e.g., the loops may have overlapping sets of group identifiers). For example, the set of load control devices 312 on loop 2 may be assigned the group identifier "1." The load control devices in the set 314 that are on loop 1 may be assigned the group identifier "1," while the load control devices in the set 314 that are on loop 2 may be assigned the group identifier "2" (e.g., because group identifier "1" on loop 2 has already been assigned to set 312). The set of load control devices 316 on loop 2 may be assigned the group identifier "3" (e.g., because group identifier "1" on loop 2 has already been assigned to set 312, and group identifier "2" on loop 2 has already been assigned to load control devices in the set 314).

Figure 3D:
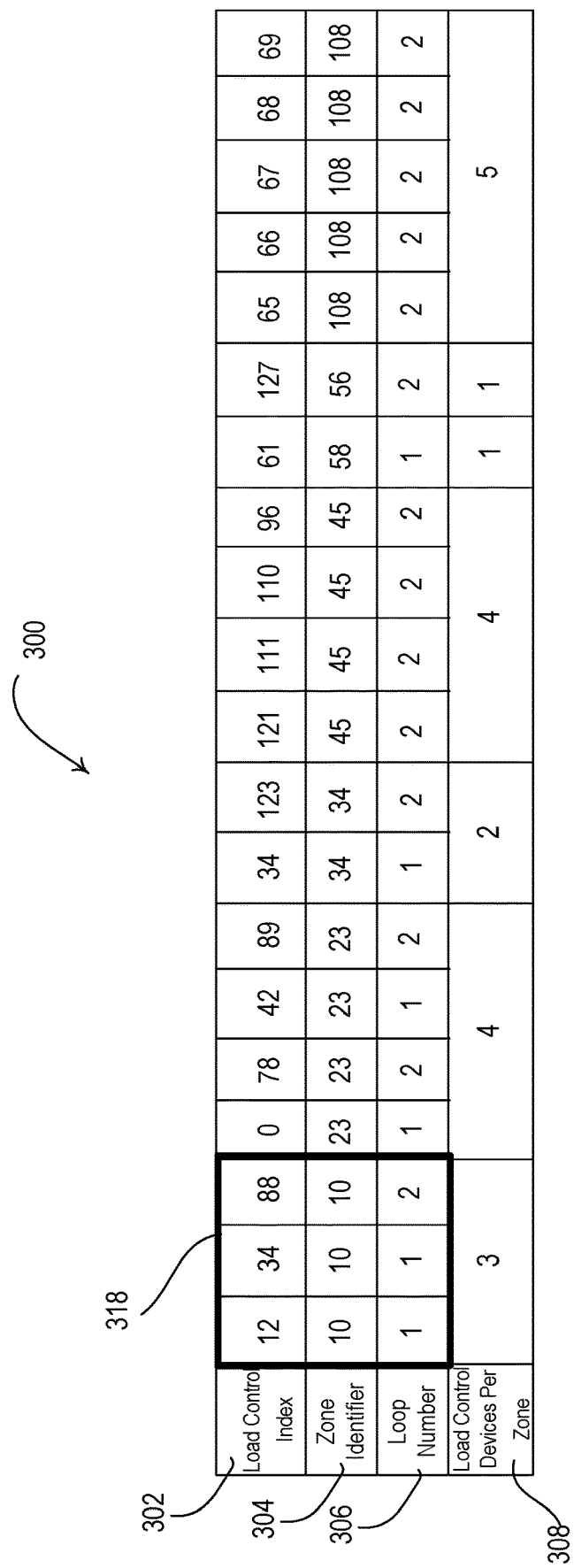

As additional group identifiers may be available on loop 1 or loop 2, the control circuit of the load controller may determine whether to assign group identifiers for another zone. As shown in FIG. 3D, the load controller may select the zone identifier with the next highest number of load control devices for being processed for group identifiers on the loops. As shown in FIG. 3D, the set of load control devices 318 includes 3 load control devices associated with the same zone identifier (e.g., zone identifier "10"). As the load control devices in the set of load control devices 318 are on different loops, the control circuit of the load controller may determine whether to assign a group identifier to the load control devices on each loop. The control circuit of the load controller may determine that the number of load control devices on loop 1 in the set of load control devices 318 is greater than the threshold (e.g., 1) and assign the load control devices on loop 1 a group identifier for receiving group messages. The control circuit of the load controller may determine that the number of load control devices on loop 2 in the set of load control devices 318 is not greater than the threshold (e.g., 1) for being assigned a group identifier. As such, the control circuit of the load controller may not assign a group identifier to the load control device on loop 2 that is associated with the zone identifier (e.g., zone identifier "10"). When the control circuit of the load controller receives a message that includes the zone identifier for the set of load control devices 318 (e.g., zone identifier "10"), or a message from input devices associated with the zone identifier for the set of load control devices 318, the control circuit of the load controller may send a group message with a group identifier on loop 1 and an individual message with a load control index, or an address on a loop that is determined from the load control index, on loop 2 for performing control of the set of load control devices 318 associated with the zone identifier. The load controller may send the messages on loop 1 and loop 2 at the same time to enable similar control of the set of load control devices 318 in the same zone, even though the load control devices are on different loops. The load controller continuing to use individual messages on loop 2 may reserve a group identifier for larger sets of load control devices in other zones that are controlled on loop 2, while still allowing similar control for the load control devices in the current zone.

As illustrated in FIGS. 3A-3D, the zone identifiers "58" and "56" may have a single load control device of the controllable load for each zone. As each zone may include a single load control device, these load control devices may not meet the threshold level for being assigned a group identifier on their loop. The load controller may communicate with these load control devices using individual messages that include the load control index, or an address on a loop that is determined from the load control index, of the load control device on each loop, respectively. Further, even though zone identifier "34" is associated with two load control devices, since each of the load control devices are on the same loop, no group identifier may be assigned for zone identifier "34."

The group identifiers for each loop may be assigned to the load control devices in a given zone in a number of ways. FIG. 4 provides an example dataset 400 that may illustrate one example that may be used by the load controller for assigning group identifiers to the load control devices on each loop to the load control devices in a given zone. As shown in FIG. 4, the load controller or another device that maintains the group identifiers for the load control devices in each zone may maintain a group array in memory for each loop on which communications are performed for controlling load control devices. The dataset 400 in FIG. 4 provides a different group array for each loop on which load control devices are controlled. For example, the dataset 400 includes a group array 402 for loop 1 and a group array 404 for loop 2. Though group arrays 402, 404 are provided for two loops, additional group arrays may be maintained if additional loops are implemented at the load controller for performing load control.

As shown in FIG. 4, the zone identifier associated with the set of load control devices on the loop may be placed in the group array 402, 404 for being assigned a group identifier 406 corresponding to the location in the group array 402, 404. For example, referring to the dataset 300 in FIGS. 3A-3D, since the zone identifier "107" is the zone identifier associated with the highest number of load control devices (e.g., largest zone) and the number of load control devices on loop 2 meets the threshold number of load control devices for loop 2, the zone identifier "107" is the first zone identifier added to the group array 404 for loop 2. The zone identifier "107" may be given the group identifier 406 of "0" on loop 2, due to its position in the group array 404 for loop 2.

Referring again to FIG. 4, since the zone identifier "23" is the zone identifier associated with the second highest number of load control devices and each of the load control devices meets the threshold on loop 1, the zone identifier "23" is the first zone identifier added to the group array 402 for loop 1. The zone identifier "23" may be given the group identifier 406 of "0" on loop 1, due to its position in the group array 402 for loop 1. Additionally, since the zone identifier "23" is the zone identifier associated with the second highest number of load control devices and the number of load control devices on loop 2 meets the threshold number of load control devices for loop 2, the zone identifier "23" is the second zone identifier added to the group array 404 for loop 2. The zone identifier "23" may be given the group identifier 406 of "1" on loop 2, due to its position in the group array 404 for loop 2.

The control circuit of the load controller may similarly assign the zone identifier "45" to the group array 404 and give the zone identifier "45" the group identifier of "2" on loop 2, since the zone identifier "45" has load control devices that are on loop 2. As the zone identifier "10" has a number of load control devices above the defined threshold for loop 1, the zone identifier "10" is added to the group array 402 for loop 1 and is given a group identifier of "1" on loop 1. Again, since the number of load control devices that are assigned the zone identifier "10" is not above the threshold for being assigned a group identifier on loop 2, the zone identifier "10" is left out of the group array 404 for loop 2, such that the available positions in the group array 404 for loop 2 are reserved for sets of load control devices that are above the defined threshold. Further, zone identifiers "34," "56," and "58" may be left out of the group array 402 and the group array 404 for reasons described herein.

The control circuit of the load controller may continue to add the zone identifiers to the group arrays 402, 404 of the dataset 400 until each array is filled and the limit for the number of group identifies 406 for each array are met. For example, each loop may be limited to 16 group identifiers 406 for transmitting group messages. After the group identifiers are assigned, the load controller may use the group identifiers for transmitting group messages for performing load control on groups of load control devices, as described herein. The control circuit of the load controller, or another device in the load control system, may remap the group identifiers for the load control devices in the dataset 400 (e.g., when load control devices or loops are added, removed, or their zones are reconfigured) for communicating with the load control devices on each loop to improve or optimize the control of the load control devices in each zone. For example, the control circuit of the load controller may remap the group identifiers for the load control devices in the dataset 400 in response to receiving a dataset comprising load control devices or load control devices that are associated with zone identifiers (e.g., as configured by a user).

To improve or optimize the load control of controllable loads on different loops that are associated with the same zone, the communication of group messages to load control devices in the same zone may be coordinated. For example, the dataset 400 may be updated to align the zone identifiers in the group arrays 402, 404 on each loop, such that the load control devices associated with the same zone identifier are given the same group identifier 406 for receiving group messages from the load controller. As shown in FIG. 4, the zone identifier "23" may be moved back in the group array 402 for loop 1 (e.g., to group identifier "1"), or moved up in the group array 404 for loop 2 (e.g., to group identifier "0"), such that each zone has the same group identifier on each loop.

By aligning the zone identifiers in the same position in the loop arrays 402, 404, having the same group identifier 406, the control circuit of the load controller may quickly identify the group identifiers to be transmitted on each loop at the same time for coordinating the control of the same zone across multiple loops. For example, the control circuit of the load controller may determine, from the messages that are queued for being transmitted to the load control devices for performing load control, that a message is to be transmitted to the load control devices in zone 23. The control circuit of the load controller may search the group array 402 for loop 1 and identify the group identifier "0" for communicating a group message to the load control devices in zone "23" on loop 1. The control circuit of the load controller may then look to the same position in the group array 404 for loop 2 to determine whether the same zone "23" has been assigned a group identifier 406 on loop 2. The control circuit of the load controller may identify the group identifier "0" is also assigned for communicating a group message to the load control devices in zone "23" on loop 2. The load controller may transmit a group message on loop 1 and a group message on loop 2 at the same time having the same group identifier for controlling the load control devices in zone "23" at the same time. In another example, the control circuit of the load controller may determine, from the messages that are queued for being transmitted to the load control devices for performing load control, that a message is to be transmitted to the load control devices in zone 10. The control circuit of the load controller may search the group array 402 for loop 1 and identify the group identifier "1" for communicating a group message to the load control devices in zone "10" on loop 1. The control circuit of the load controller may then look to the same position in the group array 404 for loop 2 to determine whether the same zone "10" has been assigned a group identifier 406 on loop 2. The control circuit of the load controller may identify that the group identifier "1" is not also assigned for communicating a group message to the load control devices in zone "10" on loop 2. The load controller then determines to transmit a group message to the load control devices in the zone "10," and may further determine whether it is necessary to send any devices in zone "10" on loop 1 that are not associated with a group identifier.

In another example, the control circuit of the load controller may identify that a group message is to be transmitted to a zone in group array 402 or group array 404, and search the other group array to determine whether the same zone identifier is in the other group array. For example, the control circuit of the load controller may determine, from the messages that are queued for being transmitted to the load control devices for performing load control, that a message is to be transmitted to the load control devices in zone 23. The control circuit of the load controller may search the group array 402 for loop 1 and identify the group identifier "0" for communicating a group message to the load control devices in zone "23" on loop 1. The control circuit of the load controller may then search the group array 404 for loop 2 to determine whether the same zone "23" has been assigned a group identifier 406 on loop 2. The control circuit of the load controller may identify the group identifier "1" for communicating a group message to the load control devices in zone "23" on loop 2. The control circuit of the load controller may transmit a group message on loop 1 and a group message on loop 2 at the same time having the different group identifiers for controlling the load control devices in zone "23" at the same time.

After the group identifiers on each of the loops have been assigned, the control circuit of the load controller may select from different message types that are used on each loop for communicating commands in an effort to reduce the number of transmissions on each loop. The reduction in the number of messages may allow for synchronous control of the electrical loads without delay, or without noticeable delay. For example, the load controller may have the option of transmitting a command to the controllable loads (e.g., load control devices) on each loop using broadcast messages, group messages, or individual messages. A broadcast message may be used to control all of the controllable loads at the same time (e.g., for an all-off or an all-on command). The broadcast messages may be received and processed by each load control device on the loop. The group messages may be received and processed by the load control devices that are associated with the group identifier in the group messages. The individual messages may include the load control index, or an address on a loop that is determined from the load control index, for communicating to the individual load control device to which the message is directed, and the load control device having the load control index or other address in the message may receive and process the message.

Figure 5:
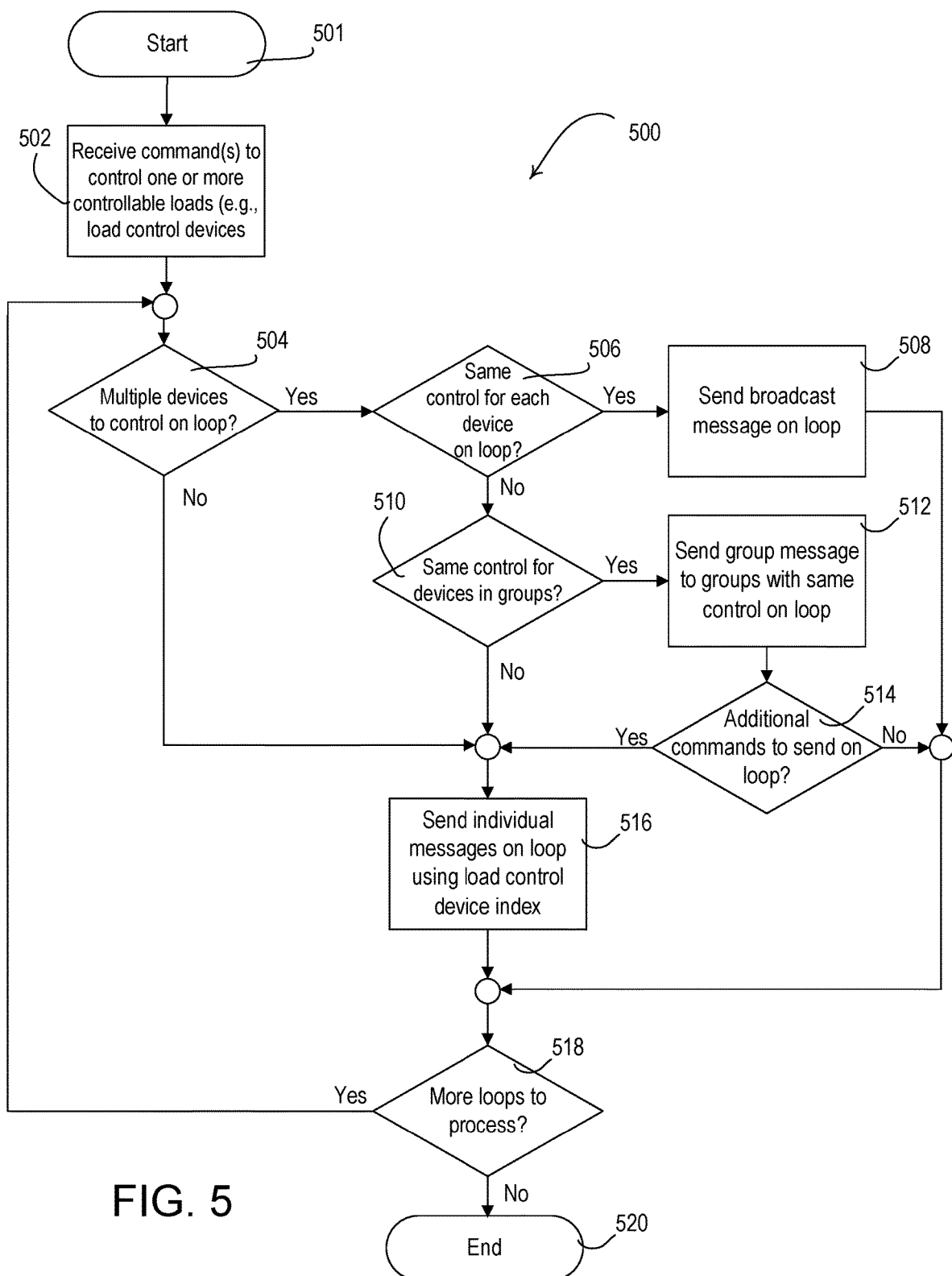
FIG. 5 is a flowchart of an example procedure that may be executed for selecting message types for transmitting commands to load control devices.

FIG. 5 is a flowchart of an example procedure 500 that may be executed for selecting message types for transmitting commands to controllable loads (e.g., load control devices). For example, the message types may include broadcast messages (e.g., messages sent to all load control devices on a given loop), group (e.g., multicast) messages (e.g., messages sent to all load control devices in a given group, but not all load control devices on a given loop), and/or individual (e.g., unicast) messages (e.g., messages sent to individual load control devices). The procedure 500 may be performed by a load controller, such as the load controller 110 shown in FIG. 1, or another device in the load control system. For example, the procedure may be performed by a wired/wireless processor, such as the wired/wireless processor 140 shown in FIG. 1, or another local or remote computing device. The procedure 500 may be stored in memory as computer-readable or machine-readable instructions that may be executed by a control circuit of one or more devices for executing the procedure. Though the procedure 500 may be described herein as being performed by a single device, such as a load controller, the procedure 500, or portions thereof, may be performed by another device or distributed across multiple devices, such as a wired/wireless processor and/or one or more other devices. Additionally, although the procedure 500 may be described herein as being performed by a single load controller, the procedure 500, or portions thereof, may be performed by one or more load controllers.

As shown in FIG. 5, the procedure 500 may begin at 501. At 502, the load controller may receive a message comprising one or more commands to control one or more controllable loads (e.g., via load control devices). For example, the load controller may receive a message comprising one or more commands to control one or more electrical loads, each of which may be associated with a respective load control device. The load controller may receive a message that comprises one or more zone identifier(s) and/or one or more unique identifiers of load control devices, and may also comprise a unique identifier of an input device from which the message is received. At 504, the control circuit of the load controller may determine the number of load control devices to be controlled on a loop in response to the commands in the message. For example, the control circuit of the load controller may identify one or more zone identifiers in the message, or look up the zone identifiers associated with the input device from which the message is received. The control circuit of the load controller may determine, at 504, whether there are one or more load control devices to be controlled on a given loop in response to the command(s) that are received in the message at 502. For example, the control circuit of the load controller may determine the number of load control devices to be controlled on a first loop in response to the received command(s). If the load controller determines that a single load control device is to be controlled on the loop being evaluated in response to the command(s) received at 502 (e.g., zone has a single load), the load controller may send an individual message to the load control device on the loop at 516. The load controller may have stored in memory the load control index for the individual load control device to be controlled.

If the control circuit of the load controller determines, at 504, that multiple load control devices are to be controlled on the loop being evaluated in response to the command(s) received at 502, the control circuit of the load controller may determine the type of control being performed for each load control device on the loop. For example, the control circuit of the load controller may determine whether each of the load control devices on the loop are to receive the same command for performing control in response to the command(s) received at 502. As an example, the load controller may receive a message that include commands for each lighting load on a loop to be controlled to the same intensity (e.g., goto 100% intensity). The command may also have a fade time over which the lighting loads are to fade to the intensity level. The load controller may receive commands that include the zones of each of the load control devices on the loop and that each include commands to control each of the load control devices on the loop to the same intensity.

If the control circuit of the load controller determines at 506 from the commands that each of the load control devices on the loop are to receive the same command for performing control, the control circuit of the load controller may determine to send a broadcast message on the loop at 508. The broadcast message may be received by each of the controllable loads (e.g., load control devices) on the loop and each of the electrical loads will be similarly controlled. For example, the lighting loads on the loop may be controlled to the same intensity. The transmission of the broadcast message may prevent any additional delay in the load control that may be caused by transmitting multiple group messages to groups of load control devices or individual messages to each of the load control devices.

The load controller may receive a message with command(s) that indicate that multiple zones or load control devices are to be similarly controlled, but the zones or load control devices may be limited due to the configuration of the load control system in a way that causes different commands to be transmitted from the load controller to the load control devices. As an example, the load controller may receive a message that includes command(s) for each lighting load in a zone or multiple zones on a loop to be controlled to the same intensity level (e.g., goto 100% intensity). The command(s) may also have a same fade time over which the lighting loads are to fade to the intensity level. The load controller may have thresholds stored thereon that limit the intensity level to which certain zones or load control devices may be controlled, such that the control may be altered for these zones or load control devices. In one example, when performing daylighting control in the load control system, the lighting loads that are located in a daylighting zone (e.g., near a window) may be limited from going above a predefined intensity level and may be controlled differently from other zones in the load control system. The load controller may limit the intensity level of the lighting control devices in a daylighting zone to 80%.

As another example, the load controller may limit the maximum intensity level for a zone or controllable load by assigning the zone or controllable load a high-end trim value. The load controller may similarly limit the minimum intensity level for a zone or controllable load by assigning the zone or controllable load a low-end trim value. The load controller may also limit the maximum intensity level for a zone or controllable load in response to daylighting measurements by assigning the zone or controllable load a daylighting trim. The daylighting trim may indicate the highest level the zone or controllable load may be controlled based on the daylight measured in an area with a gain applied. Though the high-end trim, low-end trim, and daylighting trim are provided as examples for limiting the intensity level of a zone or controllable load, other thresholds may be stored at the load controller for limiting the intensity level of lighting loads. Additionally, although thresholds may be described for limiting the control of zones or controllable loads, other types of control may similarly be limited. For example, the color range or color temperature range of lighting loads may be limited for zones or controllable loads.

In response to receiving one or more commands for performing control of controllable loads (e.g., load control devices) for a loop, the control circuit of the load controller may determine whether the thresholds that are stored thereon for limiting the control of zones or load control devices changes the type of command to be transmitted on a loop for controlling the zones or load control devices. For example, the control circuit of the load controller may use the thresholds for determining whether the same control is to be performed for each zone or load control device at 506. If a different command is to be transmitted to one or more load control devices on a given loop, the procedure 500 may continue to 510.

If the control circuit of the load controller determines, at 506, that load control devices on the loop are to receive different commands for performing control in response to the command(s) received at 502 or that not all devices are to be controlled, the control circuit of the load controller may determine, at 510, whether the same control is to be performed for the load control devices in one or more respective groups for the loop being processed. As one example, the load controller may receive a message that includes a command for a zone or multiple zones, and as such, the control circuit of the load controller may transmit a respective group message on the loop for the load control devices that are part of the respective zones. As another example, the load controller may receive a message that includes commands for each lighting load in a group to be controlled to the same intensity (e.g., goto 100% intensity). The control circuit of the load controller may similarly analyze the threshold stored thereon for the load control devices in the group to determine whether the load control devices are limited in a way that would cause a different command to be sent to one or more load control devices in the group. If the control circuit of the load controller determines at 510 from the commands that each of the load control devices in a group of load control devices on the same loop are to be transmitted the same command for performing control, the load controller may send a group message to the group of devices on the loop at 514. The group message may be received by each of the load control devices in the group and each of the electrical loads will be similarly controlled in response to the group message. For example, the lighting loads on the loop may be controlled to the same intensity. The transmission of the group message may prevent any additional delay in the load control that may be caused by transmitting individual messages to each of the load control devices.

The control circuit of the load controller may determine, at 514, whether additional commands are to be sent to load control devices on the loop after transmitting the group message(s) at 512. If additional commands are to be sent to load control devices after the group messages are sent at 512, the load controller may send individual messages at 516 on the loop using the load control index, or an address on a loop that is determined from the load control index, for each of the load control devices to be controlled. The individual messages may also, or alternatively, be sent at 516 if the control circuit of the load controller determines at 506 and 510 not to send a broadcast message or a group message(s), respectively.

The load controller may determine, at 518, whether additional loops are to be processed. For example, the load controller may process each loop on which load control devices are located for performing load control in response to the commands received at 502. If additional loops are to be processed for determining the type of message to be transmitted on the loops, the control circuit of the load controller may begin processing each of the additional loops at 504, as described herein. Once each of the loops have been processed, the procedure 500 may end at 520.

If the procedure 500 is performed by another device, such as a wired/wireless processor or another device in the load control system, the determination of the message type to be transmitted by the load controller may be made at the device by identifying the type of control to be performed in response to received commands. For example, the wired/wireless processor may have stored thereon the load control devices that are controlled by a load controller and an association of message types to be transmitted for the same or different types of control to load control devices in a given zone. The wired/wireless processor may identify from the load control index of each load control device the load control devices that are on the same loop (e.g., load control indices 0-63 on loop 1 of load controller, load control indices 64-127 on loop 2 of load controller, etc.). The control circuit of the wired/wireless processor may determine from the received commands whether load control devices on the same loop of a load controller would be instructed to perform the same type of control or a different type of control and instruct the load controller of the message type (e.g., broadcast, group, or individual message) to send. The procedure 500 may be performed by the control circuit of the wired/wireless processor for each load controller and the wired/wireless process may send a message (e.g., at 508, 512, or 516) to the load controller comprising the received command(s) at 502 or the control instructions for controlling the controllable loads with an indication of the message type to be used for communicating with the load control devices on each loop.

The use of each of the message types may allow for more efficient communication and/or control of load control devices on each of the loops controlled by the load controller. For example, the use of the different types of messages may minimize the number of commands transmitted for performing load control. The load controller may coordinate control across loops by sending a broadcast message, group message, or individual message on one loop at the same time a broadcast message, group message, or individual message is sent on the other loops to enable coordinated control across the loops.

Each message may be transmitted on a loop before evaluating the messages on another loop, or the messages may be queued for being transmitted at the same time on multiple loops. For example, if a zone of devices comprises load control devices on more than one loop that are being similarly controlled (e.g., controlled to the same intensity), the message transmitted to the load control devices on one loop may be transmitted at the same time as the message transmitted to the load control devices on another loop. For example, the procedure 500 may allow the load controller to send a group message to load control devices being controlled to the same level on a first loop at the same time a group message is sent to the load control devices being controlled to the same level on a second loop.

Figure 2B:
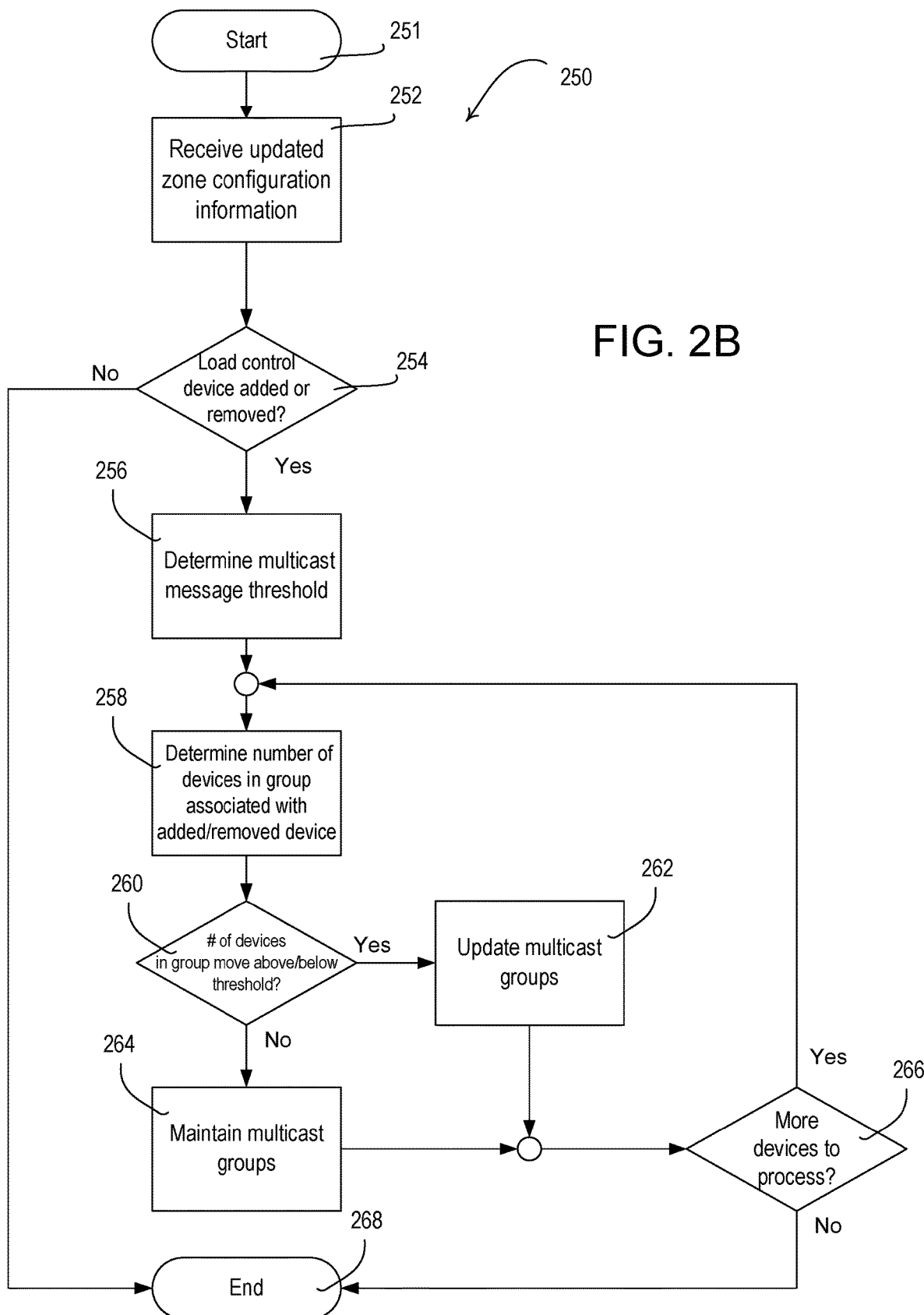
FIG. 2B is a flowchart of an example procedure for updating multicast groups when a load control device is added to or removed from a load control system.

While FIG. 2A and FIGS. 3A-3D describe grouping load control devices for communication over wired communication links, FIG. 2B describes grouping load control devices for multicast groups for messages transmitted on wireless communication links. As shown in FIG. 1, a wired/wireless processor (e.g., the wired/wireless processor 140) may transmit messages to a load controller (e.g., the load controller 110) and/or to one or more load control devices (e.g., the load control devices 122, 122b, 132a, 132b) on a wireless communication link via RF signals (e.g., RF signals 107). The messages communicated via RF signals 107 may be communicated on the same or a different wireless communication link as the messages communicated via RF signals 107. For example, the messages communicated via RF signals 107 may be transmitted using the same or a different wireless communication protocol and/or channel than the messages communicated via RF signals 107.

The wired/wireless processor 140 may be configured to transmit unicast messages to the load controller 110 and/or to the load control devices 122, 122b, 132a, 132b on a wireless communication link via RF signals 107. Each unicast message may be individually addressed to the load controller 110 and/or to the load control devices 122, 122b, 132a, 132b by including a unique identifier of the device to which the unicast message being transmitted. The unique identifier of the load control devices 122, 122b, 132a, 132b may be the load control index of each device. The unicast messages may also include the unique identifier of the wired/wireless processor 140 that is transmitting the unicast message. The load controller 110 and/or to the load control devices 122, 122b, 132a, 132b may each determine that it is the intended recipient of a unicast message by identifying its own unique identifier in the unicast message.

The wired/wireless processor 140 may be configured to transmit multicast messages and/or broadcast messages to the load controller 110 and/or to the load control devices 122, 122b, 132a, 132b on a wireless communication link via RF signals 107. A multicast message may be a type of broadcast message. Multicast messages may be sent to a group of devices in the network. A multicast message may include a multicast group identifier. The load controller 110 and/or to the load control devices 122, 122b, 132a, 132b that are members of the multicast group may recognize the multicast group identifier and process the message accordingly (e.g., may respond when member of the group). Broadcast messages may be sent to each device capable of receiving the message. The broadcast messages may include an indication that the message is a broadcast message (e.g., a broadcast address). Each device that receives a broadcast message may process the message accordingly.

The messages may be transmitted from the wired/wireless processor 140 via the RF signals 107 for enabling configuration of the load control system and/or controlling electrical loads in the load control system 100 in response to the messages that are received. The load controller 110 may similarly communicate with the load control devices 122, 122b, 132a, 132b via the RF signals 107. The wired/wireless processor 140 and/or the load controller 110 may include a memory that has stored thereon one or more associations between zone identifiers and load control indices or other unique identifiers of devices configured for each zone. The wired/wireless processor 140 may also, or alternatively, have unique identifiers of respective load controllers associated with load control devices they are able to control.

Further, as the load controller 110 and/or the wired/wireless processor 140 may be configured to communicate messages via RF signals 107, the load controller 110 and/or the wired/wireless processor 140 may remap the load control indices in one or more groups for communicate messages via RF signals 107. For example, the load controller 110 and/or the wired/wireless processor 140 may remap the load control indices in one or more multicast groups for communicating multicast messages via RF signals 107. The load controller 110 and/or the wired/wireless processor 140 may be limited to sending a predefined number of group messages (e.g., multicast messages) within a given period of time. For example, the number of multicast messages that a given device is able to send within the period of time may be limited to the predefined number. As a result, the load controller 110 and/or the wired/wireless processor 140 may perform a cost-benefit analysis for determining whether to transmit a message as a multicast message or a unicast message. The use of a multicast message for transmitting to a smaller group load control devices in a zone may cause the load controller 110 and/or the wired/wireless processor 140 to communicate unicast messages to larger groups within the period of time and increase network traffic. Utilizing the unicast messages for smaller groups of load control devices may reduce the network traffic and increase network efficiency. Additionally, the delay in control of the electrical loads that may be introduced by transmitting a series of multicast messages may be reduced for smaller groups because the time from the transmission of the message to the first device in the group to the last device in the group may be shorter.

The load controller 110 and/or the wired/wireless processor 140 may determine a number of load control devices within each multicast group. The multicast groups that have a number of control devices above a threshold may be assigned respective group identifiers (e.g., multicast identifiers). The load controller 110 or the system controller 110 may transmit multicast messages to load control devices in groups that are assigned multicast identifiers, and may transmit unicast messages to load control devices in groups that are not assigned multicast identifiers.

When a load control device is added to and/or removed from the load control system 100, the load controller 110 may update the multicast groups. For example, if one or more load control devices are added to a given group, causing the number of load control devices in that group to reach or exceed the threshold, the group may be assigned a multicast identifier. Conversely, if one or more load control devices are removed from a given group, causing the number of load control devices in that group to fall below the threshold, the multicast identifier assigned to that group may be removed and/or reassigned to another group.

FIG. 2B is a flowchart of an example procedure 250 for updating multicast groups when a load control device is added to or removed from a load control system. The procedure 250 may be performed by a load controller, such as the load controller 110 shown in FIG. 1, or another device in the load control system. For example, the procedure 250 may be performed by a wired/wireless processor, such as the wired/wireless processor 140 shown in FIG. 1, or another local or remote computing device. The procedure 250 may be stored in memory as computer-readable or machine-readable instructions that may be executed by a control circuit of one or more devices for executing the procedure. Though the procedure 250 may be described herein as being performed by a single device, such as a load controller, the procedure 250, or portions thereof, may be performed by another device or distributed across multiple devices, such as a wired/wireless processor and/or one or more other devices.

The procedure 250 may be initiated to map or remap multicast identifiers assigned to groups of load control devices for improved control of controllable loads in the same zone. For example, as described herein, load control devices in a load control system may be grouped into separate zones, each zone having a given zone identifier. The procedure 250 may be initiated when zone configuration information associated with the load control system is updated. For example, the procedure 250 may be initiated when the zone configuration information is updated. Devices in the load control system, such as a load controller (e.g., the load controller 110) and/or a wired/wireless processor (e.g., the wired/wireless processor 140) may communicate with the load control devices via a wireless communication link. If a command to control each of the load control devices within a given zone is received, it may be more efficient to transmit a single multicast message that includes the multicast group identifier rather than sending several unicast messages. However, a device may be able to send a limited number of multicast messages within a given period of time. Thus, if the device has many multicast messages queued to transmit, there may be a noticeable delay before the messages are transmitted. To reduce traffic on the wireless communication link, messages transmitted to zones having a number of load control devices above a threshold may be transmitted as multicast messages, while messages transmitted to zones having a number of load control devices below the threshold may be transmitted as unicast messages. This may reduce the overall number of messages sent over the wireless communication link within a given period of time.

As shown in FIG. 2B, the procedure 250 may begin at 251. At 252, the load controller may receive updated zone configuration information (e.g., from a system controller, a wired/wireless processor, a network device, and/or the like). The zone configuration information may include zone identifiers for identifying zones of load control devices and input devices programmed for enabling load control in the zone. The zone configuration information may include an association of zone identifiers to controllable loads and/or load control devices. The load controller may determine one or more differences (e.g., updates) in the updated zone configuration information as compared to previous zone configuration information. At 254, the control circuit of the load controller may determine whether one or more load control devices were added to or removed from the load control system based on the updated zone configuration information. If the load controller determines that no load control devices were added to or removed from the load control system, the procedure 250 may exit at 268.

If the control circuit of the load controller determines at 254 that one or more load control devices were added to or removed from the load control system, the control circuit of the load controller may determine a multicast message threshold at 256. For example, the multicast message threshold may be stored in a memory of the load controller and/or may be received from another device. The multicast message threshold may be indicated in the updated zone configuration information received by the load controller. At 258, the control circuit of the load controller may determine a number of devices in the zone associated with a first load control device that was added to or removed from the system. For example, the control circuit of the load controller may determine the number of devices in the group based on the zone configuration information. At 260, the control circuit of the load controller may determine whether the number of devices in the group associated with the first load control device has moved above or below the threshold. For example, if the first load control device is added to the group, the control circuit of the load controller may determine whether the number of devices in the group has increased above the threshold. Conversely, if the first load control device is removed from the group, the control circuit of the load controller may determine whether the number of devices in the group has decreased below the threshold.

If the load controller determines at 260 that the number of devices in the group associated with the first load control device moved above or below the threshold, the control circuit of the load controller may update one or more multicast groups at 262. For example, as described herein, the number of multicast messages that a device may transmit within a given period of time may be limited. Therefore, the control circuit of the load controller may prioritize transmitting multicast messages to relatively larger groups, and may transmit unicast messages to relatively smaller groups, which may reduce the overall number of messages sent (e.g., and wireless traffic on the wireless communication link). A group that has a number of devices that is above the multicast message threshold may be associated with a multicast group identifier for transmitting multicast messages to the group (e.g., which may be a multicast group). Groups that have a number of devices below the threshold may not be associated with a multicast identifier (e.g., messages to the group may be transmitted via unicast and/or broadcast messages). If the number of devices in the group associated with the first load control device moved above the threshold, the group associated with the first load control device may be assigned (e.g., associated with) a multicast identifier, and future messages to the group may be transmitted via multicast messages. If the number of devices in the group associated with the first load control device moved below the threshold, the group associated with the first load control device may be de-assigned (e.g., disassociated from) the multicast identifier, and future messages to the group may be transmitted via unicast and/or broadcast messages. The control circuit of the load controller may further update the zone configuration information stored in memory to reflect the new association/disassociation. The load controller may transmit one or more messages to the devices in the group associated with the first load control device that indicates that the multicast identifier has been associated with or disassociated from the group. Conversely, if the control circuit of the load controller determines at 260 that the number of devices in the group associated with the first load control device did not move above or below the threshold, the load controller may maintain the multicast groups at 264.

After the load controller either updates the multicast groups at 262, or maintains the multicast groups at 264, the load controller may determine whether there are more devices to process (e.g., whether a second load control device has been added to or removed from the load control system) at 266. If the control circuit of the load controller determines at 266 that there are more devices to process, the procedure 250 may return to 258, and the control circuit of the load controller may determine a number of devices in the group associated with the second load control device at 258 as described herein. If the control circuit of the load controller determines that 266 that there are not more devices to process, the procedure 250 may exit at 268.

Additionally and/or alternatively, the wired/wireless processor (e.g., the wired/wireless processor 140 shown in FIG. 1) may similarly group load controllers and/or load control devices it may communicate with, and may send multicast group identifier(s) to the load controllers and/or load control devices. For example, the wired/wireless processor may execute a procedure that is similar to procedure 250 described in FIG. 2B. The wired/wireless processor may use multicast messages to communicate with one or more load controllers and/or load control devices as described herein.

Figure 6:
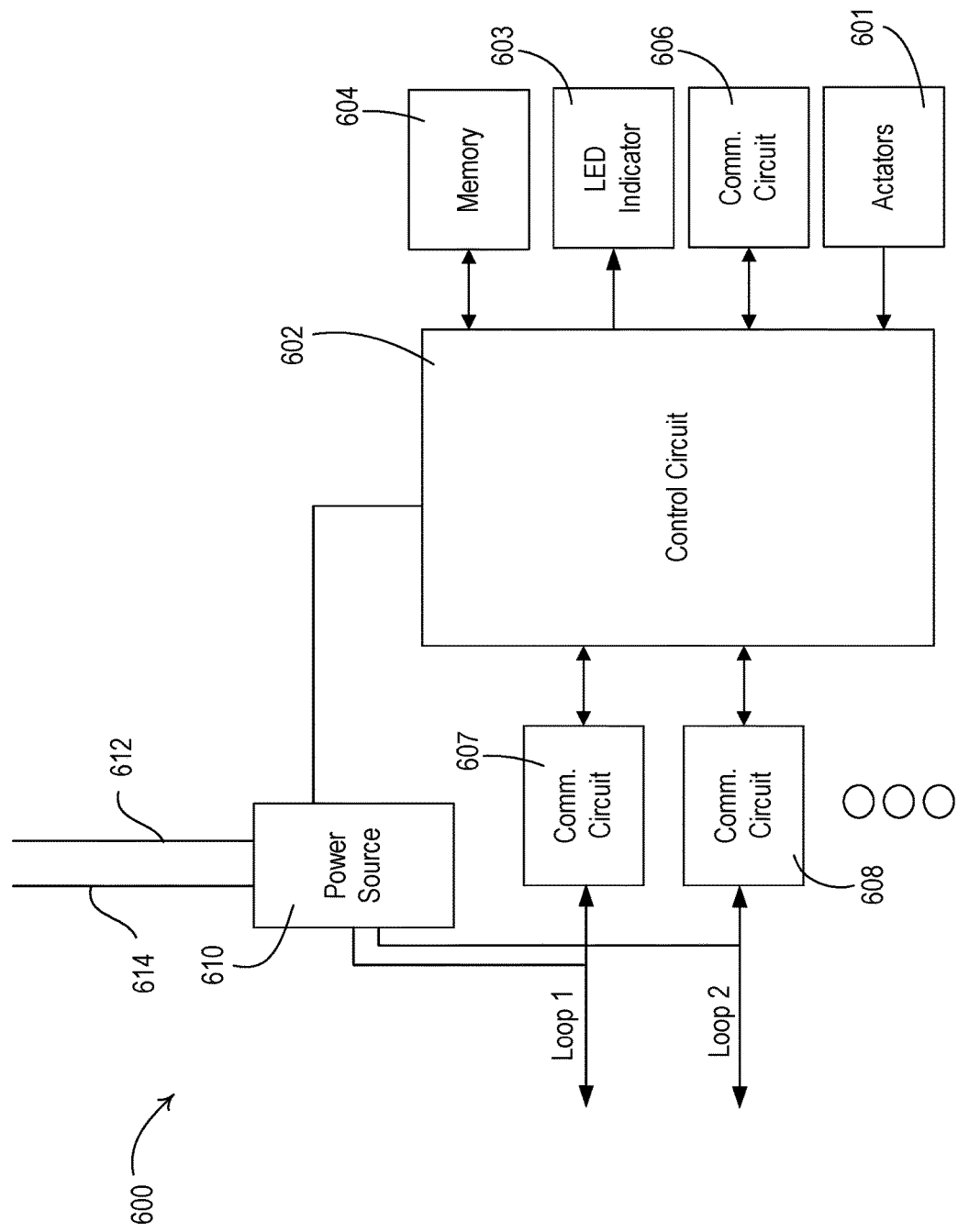
FIG. 6 is a block diagram of an example load controller.

FIG. 6 is a block diagram illustrating an example load controller 600, such as the load controller 110 shown in FIG. 1, for example. The load controller 600 may include a control circuit 602 for controlling the functionality of the controller 600, as described herein. The control circuit 602 may include one or more general purpose processors, special purpose processors, conventional processors, digital signal processors (DSPs), microprocessors, integrated circuits, a programmable logic device (PLD), application specific integrated circuits (ASICs), or the like. The control circuit 602 may perform signal coding, data processing, power control, input/output processing, or any other functionality that enables the controller 600 to perform as described herein.

The control circuit 602 may store information in and/or retrieve information from the memory 604. The memory 604 may include a non-removable memory and/or a removable memory, as described herein. For example, the memory 604 may maintain a registry of associated input devices and/or load control devices, control instructions for controlling load control devices in response to input received from one or more devices, zone identifiers and the devices associated therewith, associations between multicast identifiers and one or more devices associated therewith, load control indices for enabling control of controllable loads (e.g., load control devices), group identifiers associated with load control devices on a loop for enabling control, and/or other information described herein. The memory 604 may comprise a computer-readable storage media or machine-readable storage media that stores computer-executable instructions for performing as described herein. The computer-executable instructions may be executed to perform one or more portions of the procedures 200, 250, and/or 500 for performing as described herein. The control circuit 602 may access the instructions from memory 604 for being executed to cause the control circuit 602 to operate as described herein, or to operate one or more devices as described herein. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 604 may be implemented as an external integrated circuit (IC) or as an internal circuit of the control circuit 602.

The control circuit 602 may be in communication with an LED indicator 603 for providing indications to a user. The control circuit 602 may be in communication with an actuator 601 (e.g., one or more buttons) that may be actuated by a user to communicate user selections to the control circuit 602. For example, the actuator 601 may be actuated to put the control circuit 602 in an association mode and/or communicate association messages from the load controller 600.

A load controller 600 may receive power via the hot connection 612 and the neutral connection 614 and may provide an amount of power to other devices in the load control system. For example, the hot connection 612 and the neutral connection 614 may be a part of the power line 160 on which power is provided from the AC power source 102 shown in FIG. 1.

The load controller 600 may comprise a communication circuit 606 for communicating with other devices in the load control system. For example, the communication circuit 606 may be capable of sending and/or receiving messages via a wired communication link, such as the wired communication ink 104 illustrated in FIG. 1. In another example, the communication circuit may be capable of sending and/or receiving messages via a wireless communication link, such as one of the RF communication links described herein.

The load controller 600 may include one or more wired communication circuits for communicating with load control devices via one or more loops. For example, the load controller 600 may include wired communication circuit 607 and/or wired communication circuit 608, for transmitting and/or receiving messages via one or more loops. The load controller 600 may comprise a communication circuit for each loop on which the load controller is capable of communicating, or a single communication circuit may be configured to communicate on each of the loops. The wired communication circuits 607, 608 may transmit and/or receive information via wired communication links (e.g., the loops described herein). The communication circuits 607, 608 may include a transmitter, a receiver, a transceiver, or other circuit capable of performing wired communications on a wired communication link. For example, the wired communication link may be a DALI communication link, as described herein. In another example, the communication circuits 607, 608 may comprise a wireless communication circuit capable of transmitting and/or receiving messages via a wireless communication link. The wireless communication link may be the same as or different than a wireless communication link on which the communication circuit 606 is configured to communicate. For example, one of the communication circuits 607, 608 may communicate on a first wireless communication link using a first wireless communication protocol (e.g., a wireless network communication protocol, such as the CLEAR CONNECT (e.g., CLEAR CONNECT A and/or CLEAR CONNECT X) and/or THREAD protocols) and/or on a first wireless communication channel, while the communication circuit 606 may communicate on a second wireless communication link using a second wireless communication protocol (e.g., a short-range wireless communication protocol, such as the BLUETOOTH and/or BLUETOOTH LOW ENERGY (BLE) protocols) and/or a second wireless communication channel. The wired communication links may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The wired communication links may comprise power lines using a power line carrier (PLC) communication technique. The wireless communication circuits may include one or more RF or infrared (IR) transmitters, receivers, transceivers, or other communication circuits capable of performing wireless communications.

The load controller 600 may be powered by a power source 610. The power source 610 may include an AC power supply or DC power supply, for example. The power source 610 may generate a supply voltage for powering the load controller 600. The power source 610 may convert the AC power from the AC power source that is received via hot connection 612 and neutral connection 614 to loop power for each loop.

Figure 7:
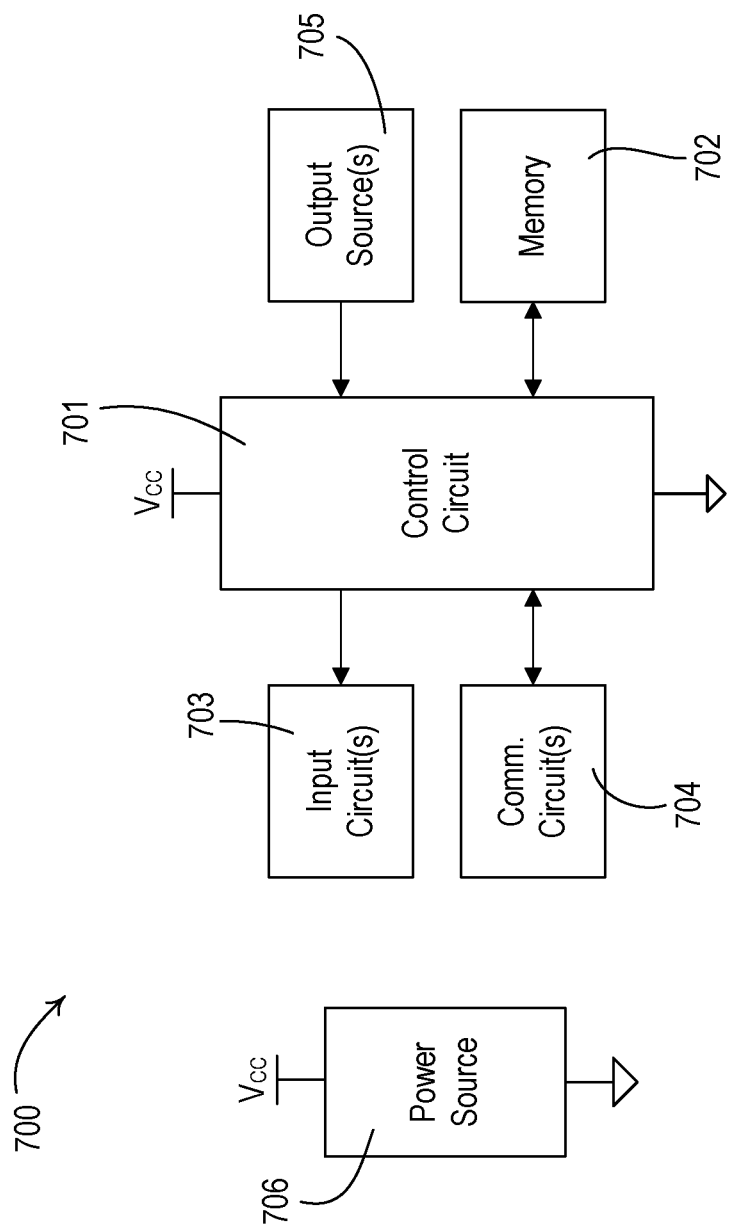
FIG. 7 is a simplified block diagram of an example device.

FIG. 7 is a block diagram illustrating an example of a device 700 capable of processing and/or communication in a load control system, such as the load control system 100 of FIG. 1. In an example, the device 700 may be a control device (e.g., input devices, such as keypad device 150 and/or sensor 166) capable of transmitting or receiving messages. The device 700 may be a wired/wireless processor, such as the wired/wireless processor 140 shown in FIG. 1, for example. The device 700 may be a network computing device, such as the network computing device 164 shown in FIG. 1, for example.

The device 700 may include a control circuit 701 for controlling the functionality of the device 700. The control circuit 701 may include one or more general purpose processors, special purpose processors, conventional processors, digital signal processors (DSPs), microprocessors, integrated circuits, a programmable logic device (PLD), application specific integrated circuits (ASICs), or the like. The control circuit 701 may perform signal coding, data processing, image processing, power control, input/output processing, or any other functionality that enables the device 700 to perform as one of the devices of the load control system (e.g., load control system 100) described herein.

The control circuit 701 may be communicatively coupled to a memory 702 to store information in and/or retrieve information from the memory 702. For example, the memory 702 may maintain a registry of associated input devices and/or load control devices, zone identifiers and the devices associated therewith, control instructions for controlling load control devices in response to input received from one or more devices, load control indices for enabling control of controllable loads (e.g., load control devices), group identifiers associated with load control devices on a loop for enabling control, associations between multicast identifiers and one or more devices associated therewith, unique identifiers of load controllers that are associated with load control devices that they are able to control, and/or other information described herein. The memory 702 may comprise a computer-readable storage media or machine-readable storage media that stores computer-executable instructions for performing as described herein. When the device 700 is a system controller, load controller, or another device configured to group devices or transmit messages as described herein, the computer-executable instructions may perform one or more portions of the procedures 200, 250, and/or 500 for performing as described herein. The control circuit 701 may access the instructions from memory 702 for being executed to cause the control circuit 701 to operate as described herein, or to operate one or more devices as described herein. The memory 702 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 702 may be implemented as an external integrated circuit (IC) or as an internal circuit of the control circuit 701.

The device 700 may include one or more communication circuits 704 that are in communication with the control circuit 701 for sending and/or receiving information as described herein. The communication circuits 704 may perform wireless and/or wired communications. The communication circuits 704 may include a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 704 may be configured to communicate via power lines (e.g., the power lines from which the device 130 receives power) using a power line carrier (PLC) communication technique. The communication circuits 704 may include a wireless communication circuit including one or more RF or infrared (IR) transmitters, receivers, transceivers, or other communication circuits capable of performing wireless communications.

Though a single communication circuit 704 may be illustrated, multiple communication circuits may be implemented in the device 700. The device 700 may include a communication circuit configured to communicate via one or more wired and/or wireless communication networks and/or protocols and at least one other communication circuit configured to communicate via one or more other wired and/or wireless communication networks and/or protocols. For example, a first communication circuit may be configured to communicate via a wired or wireless communication link, while another communication circuit may be capable of communicating on another wired or wireless communication link. The first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols) and/or on a first wireless communication channel, and the second communication circuit may be configured to communicate via a second wireless communication link (e.g., a short-range or direct wireless communication link) using a second wireless protocol (e.g., a short-range wireless communication protocol, such as the BLUETOOTH and/or BLUETOOTH LOW ENERGY (BLE) protocols) and/or on a second wireless communication channel. In another example, the first communication circuit may be configured to communicate via a first wireless communication link (e.g., a wireless network communication link) using a first wireless protocol (e.g., a wireless network communication protocol, such as the CLEAR CONNECT (e.g., CLEAR CONNECT A and/or CLEAR CONNECT X) and/or THREAD protocols), and the second communication circuit may be configured to communicate via a wired communication link.

One of the communication circuits 704 may comprise a beacon transmitting and/or receiving circuit capable of transmitting and/or receiving beacon messages via a short-range RF signal. The control circuit 701 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 701.

The control circuit 701 may be in communication with one or more input circuits 705 from which inputs may be received. The input circuits 704 may be included in a user interface for receiving inputs from the user. For example, the input circuits 704 may include an actuator (e.g., a momentary switch that may be actuated by one or more physical buttons) that may be actuated by a user to communicate user input or selections to the control circuit 701. In response to an actuation of the actuator, the control circuit 701 may enter an association mode, transmit association messages from the device 700 via the communication circuits 704, and/or receive other information (e.g., control instructions for performing control of an electrical load). In response to an actuation of the actuator may perform control by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 701 of the device 700 may enter the association mode, transmit an association message, transmit control instructions, or perform other functionality in response to an actuation or input from the user on the touch sensitive surface.

The input circuits 703 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the device 700). The control circuit 701 may receive information from the one or more input circuits 703 and process the information for performing functions as described herein.

The control circuit 701 may be in communication with one or more output sources 705. The output sources 705 may include one or more light sources (e.g., LEDs) for providing indications (e.g., feedback) to a user. The output sources 705 may include a display (e.g., a visible display) for providing information (e.g., feedback) to a user. The control circuit 701 and/or the display may generate a graphical user interface (GUI) generated via software for being displayed on the device 700 (e.g., on the display of the device 700).

The user interface of the device 700 may combine features of the input circuits 703 and the output sources 705. For example, the user interface may have buttons that actuate the actuators of the input circuits 703 and may have indicators (e.g., visible indicators) that may be illuminated by the light sources of the output sources 705. In another example, the display and the control circuit 701 may be in two-way communication, as the display may display information to the user and include a touch screen capable of receiving information from a user. The information received via the touch screen may be capable of providing the indicated information received from the touch screen as information to the control circuit 701 for performing functions or control.

Each of the hardware circuits within the device 700 may be powered by a power source 706. The power source 706 may include a power supply configured to receive power from an alternating-current (AC) power supply or a direct-current (DC) power supply, for example. In addition, the power source 706 may comprise one or more batteries. The power source 706 may produce a supply voltage $V_{CC}$ for powering the hardware within the device 700.

Figure 8:
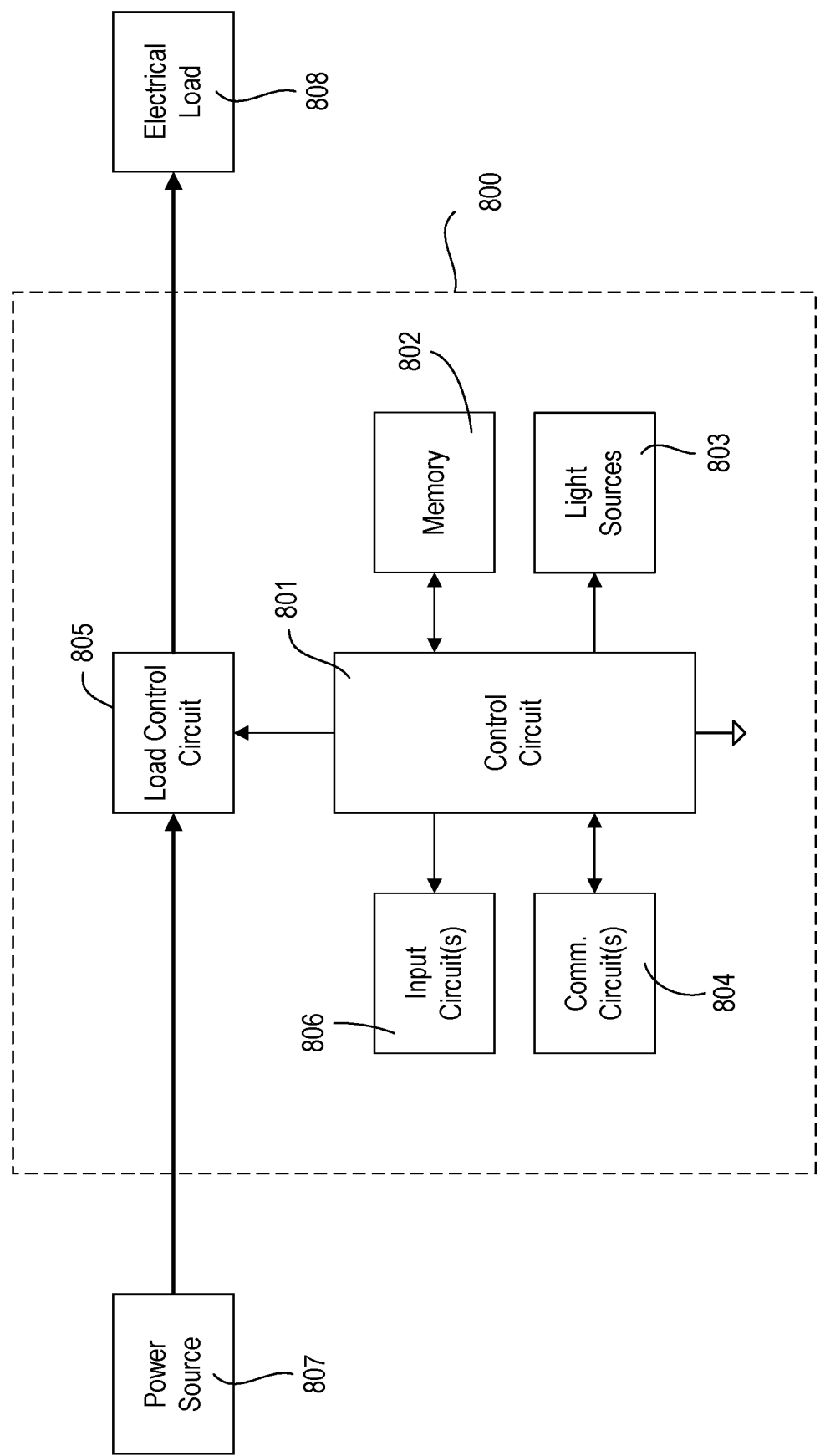
FIG. 8 is a simplified block diagram of an example load control device.

FIG. 8 is a block diagram illustrating an example load control device 800. such as the load control devices 122a, 122b, 132a, 132b shown in FIG. 1, for example. The load control device 800 may be a dimmer switch, an electronic switch, an electronic lighting control device for lamps, an LED driver for LED light sources, a ballast for controlling fluorescent lamps, or other lighting control device. In an example, the load control device 800 may be an example of a lighting control device, or another load control device.

The load control device 800 may include a control circuit 801 for controlling the functionality of the load control device 800. The control circuit 801 may include one or more general purpose processors, special purpose processors, conventional processors, digital signal processors (DSPs), microprocessors, integrated circuits, a programmable logic device (PLD), application specific integrated circuits (ASICs), or the like. The control circuit 801 may perform signal coding, data processing, image processing, power control, input/output processing, or any other functionality that enables the load control device 800 to perform as one of the devices of the load control system (e.g., load control system 100) described herein.

The load control device 800 may include a load control circuit 805 that may be electrically coupled in series between a power source 807 (e.g., an AC power source and/or a DC power source) and an electrical load 808. The control circuit 801 may be configured to control the load control circuit 805 for controlling the electrical load 808, for example, in response to received instructions or messages, such as messages that comprise sensor data, for example. The electrical load 808 may include a lighting load, a motor load (e.g., for a ceiling fan and/or exhaust fan), an electric motor for controlling a motorized window treatment, a component of a heating, ventilation, and cooling (HVAC) system, a speaker, or any other type of electrical load.

The control circuit 801 may be communicatively coupled to a memory 802 to store information in and/or retrieve information from the memory 802. The memory 802 may comprise a computer-readable storage media or machine-readable storage media that maintains a device dataset of associated device identifiers, network information, and/or computer-executable instructions for performing as described herein. For example, the memory 802 may comprise computer-executable instructions or machine-readable instructions that are capable of controlling the electrical load 808 as described herein. The control circuit 801 may access the instructions from memory 802 for being executed to cause the control circuit 801 to operate as described herein, or to operate one or more devices as described herein. The memory 802 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 802 may be implemented as an external integrated circuit (IC) or as an internal circuit of the control circuit 801.

The control circuit 801 may store information in and/or retrieve information from the memory 802. For example, the memory 802 may maintain a registry of associated input devices, a load control index associated with the load control device 800 for enabling control, a group identifier associated with the load control device 800 on a loop for enabling control, a multicast identifier associated with the load control device 800 for enabling control, and/or a zone identifier associated with the load control device 800 for enabling control. The memory 802 may include instructions stored thereon for controlling the electrical load in response to messages received from a load controller on the loop. The memory 802 may include a non-removable memory and/or a removable memory. The load control circuit 805 may receive instructions from the control circuit 801 and may control an electrical load 808 based on the received instructions. The load control circuit 805 may send status feedback to the control circuit 801 regarding the status of the electrical load 808. The electrical load 808 may include any type of electrical load, such as a lighting load (e.g., LED, fluorescent lamp, etc.)

The load control device 800 may include one or more communication circuits 804 that are in communication with the control circuit 801 for sending and/or receiving information as described herein. The communication circuit 804 may perform wireless and/or wired communications. For example, the communication circuit 804 may be configured to communicate on a wired communication link, such as the wired communication link 104 shown in FIG. 1. Referring again to FIG. 8, the communication circuit 804 may be capable of receiving communications on a wired power/communication link. The communication circuit 804 may be a wired communication circuit capable of communicating on a wired communication link. The wired communication link may include an Ethernet communication link, an RS-485 serial communication link, a 0-10 volt analog link, a pulse-width modulated (PWM) control link, a Digital Addressable Lighting Interface (DALI) digital communication link, and/or another wired communication link. The communication circuit 804 may be configured to communicate via power lines (e.g., the power lines from which the load control device 800 receives power) using a power line carrier (PLC) communication technique. The communication circuit 804 may be a wireless communication circuit including one or more RF or IR transmitters, receivers, transceivers, or other communication circuits capable of performing wireless communications.

Though a single communication circuit 804 may be illustrated, multiple communication circuits may be implemented in the load control device 800. The load control device 800 may include a communication circuit configured to communicate via one or more wired and/or wireless communication networks and/or protocols and at least one other communication circuit configured to communicate via one or more other wired and/or wireless communication networks and/or protocols.

One of the communication circuits 804 may comprise a beacon transmitting and/or receiving circuit capable of transmitting and/or receiving beacon messages via a short-range RF signal. A control circuit 801 may communicate with beacon transmitting circuit (e.g., a short-range communication circuit) to transmit beacon messages. The beacon transmitting circuit may communicate beacon messages via RF communication signals, for example. The beacon transmitting circuit may be a one-way communication circuit (e.g., the beacon transmitting circuit is configured to transmit beacon messages) or a two-way communication circuit capable of receiving information on the same network and/or protocol on which the beacon messages are transmitted (e.g., the beacon transmitting circuit is configured to transmit and receive beacon messages). The information received at the beacon transmitting circuit may be provided to the control circuit 801.

The control circuit 801 may be in communication with one or more input circuits 806 from which inputs may be received. The input circuits 806 may be included in a user interface for receiving inputs from the user. For example, the input circuits 806 may include an actuator (e.g., a momentary switch that may be actuated by one or more physical buttons) that may be actuated by a user to communicate user input or selections to the control circuit 801. In response to an actuation of the actuator, the control circuit 801 may enter an association mode, transmit association messages from the load control device 800 via the communication circuits 804, and/or receive other information. In response to an actuation of the actuator may perform control by controlling the load control circuit 805 to control the electrical load 800, and/or by transmitting control instructions indicating the actuation on the user interface and/or the control instructions generated in response to the actuation. The actuator may include a touch sensitive surface, such as a capacitive touch surface, a resistive touch surface an inductive touch surface, a surface acoustic wave (SAW) touch surface, an infrared touch surface, an acoustic pulse touch surface, or another touch sensitive surface that is configured to receive inputs (e.g., touch actuations/inputs), such as point actuations or gestures from a user. The control circuit 801 of the load control device 800 may enter the association mode, transmit an association message, control the load control circuit 805, transmit control instructions, or perform other functionality in response to an actuation or input from the user on the touch sensitive surface.

The input circuits 806 may include a sensing circuit (e.g., a sensor). The sensing circuit may be an occupant sensing circuit, a temperature sensing circuit, a color (e.g., color temperature) sensing circuit, a visible light sensing circuit (e.g., a camera), a daylight sensing circuit or ambient light sensing circuit, or another sensing circuit for receiving input (e.g., sensing an environmental characteristic in the environment of the load control device 800). The control circuit 801 may receive information from the one or more input circuits 806 and process the information for performing functions as described herein.

The control circuit 801 may illuminate a light sources 803 (e.g., LEDs) to provide feedback to a user. The control circuit 801 may be operable to illuminate the light sources 803 different colors. The light sources 803 may be illuminate, for example, one or more indicators (e.g., visible indicators) of the load control device 800.

Although features and elements are described herein in particular combinations, each feature or element can be used alone or in any combination with the other features and elements. The methods described herein may be implemented in a computer program, software, instructions, or firmware stored on one or more non-transitory computer-readable media for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. An apparatus comprising:
a communication circuit; and
a control circuit configured to:
receive a command for controlling a plurality of load control devices for controlling respective electrical loads, wherein a first subset of the plurality of load control devices associated with a first zone identifier are assigned a first group identifier and a second subset of the plurality of load control devices associated with a second zone identifier are assigned a second group identifier based on zone configuration information received from a network computing device, and wherein the first group identifier is configured for communicating group messages to the first subset and the second group identifier is configured for communicating group messages to the second subset;
determine whether the command is configured to cause a same type of control or a different type of control of the first subset and the second subset; and
transmit, via the communication circuit, one or more messages using a first message type when the command is configured to cause a same type of control of the first subset and the second subset and using a second message type when the command is configured to cause a different type of control of the first subset and the second subset, wherein the first message type is a broadcast message.

2. The apparatus of claim 1, wherein the apparatus is a load controller or a system controller in communication with one or more load controllers.

3. The apparatus of claim 1, wherein the load control devices are lighting control devices for controlling respective lighting loads.

4. The apparatus of claim 1, wherein the zone configuration information comprises an association of zone identifiers to load control devices for controlling the lighting loads, and wherein the control circuit is further configured to:
determine a number of load control devices per zone identifier in the zone configuration information;
identify the first zone identifier as having a highest number of load control devices in the zone configuration information;
assign the first group identifier to the first subset based on the load control devices of the first subset being associated with the first zone identifier having the highest number of load control devices;
identify the second zone identifier as having a second highest number of load control devices in the zone configuration information; and
assign the second group identifier to the second subset based on the load control devices of the second subset being associated with the second zone identifier having the second highest number of load control devices.

5. The apparatus of claim 1, wherein the first subset of load control devices comprises a first load control device and a second load control device, and wherein the control circuit is further configured to:
determine that the command is configured to cause the different type of control to the first subset and the second subset;
determine that the command is configured to cause a similar type of control of the first load control device and the second load control device; and
transmit, via the communication circuit, a first group message comprising the command for controlling the first load control device and the second load control device.

6. The apparatus of claim 5, wherein the second subset of load control devices comprises a third load control device and a fourth load control device, and wherein the control circuit is further configured to:
determine that the command is configured to cause a similar type of control of the third load control device and the fourth load control device; and
transmit, via the communication circuit, a second group message comprising the command for controlling the third load control device and the fourth load control device.

7. The apparatus of claim 5, wherein the second subset of load control devices comprises a third load control device and a fourth load control device, and wherein the control circuit is further configured to:
  determine that the command is configured to cause a different type of control of the third load control device and the fourth load control device; and
  transmit, via the communication circuit, respective individual messages to each of the second subset of load control devices.

8. The apparatus of claim 1, wherein the first subset of load control devices comprises a first load control device and a second load control device, and wherein the control circuit is further configured to:
  determine that the command is configured to cause the different type of control to the first subset and the second subset;
  determine that the command is configured to cause a different type of control of the first load control device and the second load control device; and
  transmit, via the communication circuit, respective individual messages to each of the first subset of load control devices.

9. The apparatus of claim 8, wherein the second subset of load control devices comprises a third load control device and a fourth load control device, and wherein the control circuit is further configured to:
  determine that the command is configured to cause a different type of control of the third load control device and the fourth load control device; and
  transmit, via the communication circuit, respective individual messages to each of the second subset of load control devices.

10. The apparatus of claim 1, wherein the first zone identifier is configured for identifying that the first subset of the load control devices are associated with a first zone and the second zone identifier is configured for identifying that the second subset of the load control devices are associated with a second zone.

11. The apparatus of claim 1, wherein the control circuit being configured to determine whether the command is configured to cause a same type of control or a different type of control of the first subset and the second subset comprises the control circuit being configured to determine whether the command is configured to cause the respective electrical loads of the first subset of the load control devices and the respective electrical loads of the second subset of the load control devices to be controlled to a same level or a different level.

12. One or more non-transitory computer readable media having instructions stored thereon that, when executed by a control circuit, cause the control circuit to:
  receive a command for controlling a plurality of load control devices for controlling respective electrical loads, wherein a first subset of the plurality of load control devices associated with a first zone identifier are assigned a first group identifier and a second subset of the plurality of load control devices associated with a second zone identifier are assigned a second group identifier based on zone configuration information received from a network computing device, and wherein the first group identifier is configured for communicating group messages to the first subset and the second group identifier is configured for communicating group messages to the second subset;
  determine whether the command is configured to cause a same type of control or a different type of control of the first subset and the second subset; and
  transmit, via the communication circuit, one or more messages using a first message type when the command is configured to cause a same type of control of the first subset and the second subset and using a second message type when the command is configured to cause a different type of control of the first subset and the second subset, wherein the first message type is a broadcast message.

13. The non-transitory computer readable media of claim 12, wherein the zone configuration information comprises an association of zone identifiers to load control devices for controlling the lighting loads, and wherein the instructions further cause the control circuit to:
  determine a number of load control devices per zone identifier in the zone configuration information;
  identify the first zone identifier as having a highest number of load control devices in the zone configuration information;
  assign the first group identifier to the first subset based on the load control devices of the first subset being associated with the first zone identifier having the highest number of load control devices;
  identify the second zone identifier as having a second highest number of load control devices in the zone configuration information; and
  assign the second group identifier to the second subset based on the load control devices of the second subset being associated with the second zone identifier having the second highest number of load control devices.

14. The non-transitory computer readable media of claim 12, wherein the first subset of load control devices comprises a first load control device and a second load control device, and wherein the instructions further cause the control circuit to:
  determine that the command is configured to cause the different type of control to the first subset and the second subset;
  determine that the command is configured to cause a similar type of control of the first load control device and the second load control device; and
  transmit, via the communication circuit, a first group message comprising the command for controlling the first load control device and the second load control device.

15. The non-transitory computer readable media of claim 14, wherein the second subset of load control devices comprises a third load control device and a fourth load control device, and wherein the instructions further cause the control circuit to:
  determine that the command is configured to cause a similar type of control of the third load control device and the fourth load control device; and
  transmit, via the communication circuit, a second group message comprising the command for controlling the third load control device and the fourth load control device.

16. The non-transitory computer readable media of claim 14, wherein the second subset of load control devices comprises a third load control device and a fourth load control device, and wherein the instructions further cause the control circuit to:
  determine that the command is configured to cause a different type of control of the third load control device and the fourth load control device; and
  transmit, via the communication circuit, respective individual messages to each of the second subset of load control devices.

17. The non-transitory computer readable media of claim 12, wherein the first subset of load control devices comprises a first load control device and a second load control device, and wherein the instructions further cause the control circuit to:
  determine that the command is configured to cause the different type of control to the first subset and the second subset;
  determine that the command is configured to cause a different type of control of the first load control device and the second load control device; and
  transmit, via the communication circuit, respective individual messages to each of the first subset of load control devices.

18. The non-transitory computer readable media of claim 17, wherein the second subset of load control devices comprises a third load control device and a fourth load control device, and wherein the instructions further cause the control circuit to:
  determine that the command is configured to cause a different type of control of the third load control device and the fourth load control device; and
  transmit, via the communication circuit, respective individual messages to each of the second subset of load control devices.

19. The non-transitory computer readable media of claim 12, wherein the load control devices are lighting control devices for controlling respective lighting loads.

20. The non-transitory computer readable media of claim 12, wherein the first zone identifier is configured for identifying that the first subset of the load control devices are associated with a first zone and the second zone identifier is configured for identifying that the second subset of the load control devices are associated with a second zone.

21. The non-transitory computer readable media of claim 12, wherein the instructions causing the control circuit to determine whether the command is configured to cause a same type of control or a different type of control of the first subset and the second subset comprises the instructions causing the control circuit to determine whether the command is configured to cause the respective electrical loads of the first subset of the load control devices and the respective electrical loads of the second subset of the load control devices to be controlled to a same level or a different level.

22. A method comprising:
  receiving a command for controlling a plurality of load control devices for controlling respective electrical loads, wherein a first subset of the plurality of load control devices associated with a first zone identifier are assigned a first group identifier and a second subset of the plurality of load control devices associated with a second zone identifier are assigned a second group identifier based on zone configuration information received from a network computing device, and wherein the first group identifier is configured for communicating group messages to the first subset and the second group identifier is configured for communicating group messages to the second subset;
  determining whether the command is configured to cause a same type of control or a different type of control of the first subset and the second subset; and
  transmitting one or more messages using a first message type when the command is configured to cause a same type of control of the first subset and the second subset and using a second message type when the command is configured to cause a different type of control of the first subset and the second subset, wherein the first message type is a broadcast message.

23. The method of claim 22, wherein the zone configuration information comprises an association of zone identifiers to load control devices for controlling the lighting loads, and wherein the method further comprises:
  determining a number of load control devices per zone identifier in the zone configuration information;
  identifying the first zone identifier as having a highest number of load control devices in the zone configuration information;
  assigning the first group identifier to the first subset based on the load control devices of the first subset being associated with the first zone identifier having the highest number of load control devices;
  identifying the second zone identifier as having a second highest number of load control devices in the zone configuration information; and
  assigning the second group identifier to the second subset based on the load control devices of the second subset being associated with the second zone identifier having the second highest number of load control devices.

24. The method of claim 22, wherein the first subset of load control devices comprises a first load control device and a second load control device, and wherein the method further comprises:
  determining that the command is configured to cause the different type of control to the first subset and the second subset;
  determining that the command is configured to cause a similar type of control of the first load control device and the second load control device; and
  transmitting a first group message comprising the command for controlling the first load control device and the second load control device.

25. The method of claim 24, wherein the second subset of load control devices comprises a third load control device and a fourth load control device, and wherein the method further comprises:
  determining that the command is configured to cause a similar type of control of the third load control device and the fourth load control device; and
  transmitting a second group message comprising the command for controlling the third load control device and the fourth load control device.

26. The method of claim 24, wherein the second subset of load control devices comprises a third load control device and a fourth load control device, and wherein the method further comprises:
  determining that the command is configured to cause a different type of control of the third load control device and the fourth load control device; and
  transmitting respective individual messages to each of the second subset of load control devices.

27. The method of claim 22, wherein the first subset of load control devices comprises a first load control device and a second load control device, and wherein the method further comprises:
  determining that the command is configured to cause the different type of control to the first subset and the second subset;
  determining that the command is configured to cause a different type of control of the first load control device and the second load control device; and
  transmitting respective individual messages to each of the first subset of load control devices.

28. The method of claim 27, wherein the second subset of load control devices comprises a third load control device and a fourth load control device, and wherein the method further comprises:
  determining that the command is configured to cause a different type of control of the third load control device and the fourth load control device; and
  transmitting respective individual messages to each of the second subset of load control devices.

29. The method of claim 22, wherein the load control devices are lighting control devices for controlling respective lighting loads.

30. The method of claim 22, wherein the first zone identifier is configured for identifying that the first subset of the load control devices are associated with a first zone and the second zone identifier is configured for identifying that the second subset of the load control devices are associated with a second zone.

31. The method of claim 22, wherein determining whether the command is configured to cause a same type of control or a different type of control of the first subset and the second subset comprises determining whether the command is configured to cause the respective electrical loads of the first subset of the load control devices and the respective electrical loads of the second subset of the load control devices to be controlled to a same level or a different level.

* * * * *